(12) United States Patent
Takamoto et al.

(10) Patent No.: US 8,190,717 B2
(45) Date of Patent: *May 29, 2012

(54) METHOD OF BOOTING AN OPERATING SYSTEM

(75) Inventors: Yoshifumi Takamoto, Kokubunji (JP); Hiroshi Kurokawa, Hadano (JP); Keisuke Hatasaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 12/361,680

(22) Filed: Jan. 29, 2009

(65) Prior Publication Data

US 2009/0138580 A1 May 28, 2009

Related U.S. Application Data

(63) Continuation of application No. 11/007,339, filed on Dec. 9, 2004, now Pat. No. 7,509,401.

(30) Foreign Application Priority Data

Aug. 31, 2004 (JP) ................................. 2004-251215

(51) Int. Cl.
*G06F 15/177* (2006.01)
(52) U.S. Cl. ....................................................... 709/220
(58) Field of Classification Search .................. 709/220, 709/221, 223
See application file for complete search history.

(56) References Cited

U.S. PATENT DOCUMENTS

| | | | | |
|---|---|---|---|---|
| 5,920,567 A * | 7/1999 | Saito et al. | ..................... | 370/404 |
| 6,085,238 A * | 7/2000 | Yuasa et al. | ................... | 709/223 |
| 6,542,961 B1 * | 4/2003 | Matsunami et al. | .......... | 711/114 |
| 6,606,690 B2 * | 8/2003 | Padovano | ...................... | 711/148 |
| 6,687,748 B1 * | 2/2004 | Zhang et al. | .................... | 709/223 |
| 7,146,233 B2 * | 12/2006 | Aziz et al. | ...................... | 700/101 |
| 7,194,538 B1 * | 3/2007 | Rabe et al. | ..................... | 709/224 |
| 7,228,345 B2 * | 6/2007 | Larson et al. | ................. | 709/222 |
| 7,328,260 B1 * | 2/2008 | Muthiyan et al. | ............. | 709/224 |
| 7,356,679 B1 * | 4/2008 | Le et al. | ............................ | 713/1 |
| 7,430,593 B2 * | 9/2008 | Baldwin et al. | ............... | 709/223 |
| 7,437,469 B2 * | 10/2008 | Ellanti et al. | ................... | 709/229 |
| 7,680,957 B1 * | 3/2010 | Ketterhagen et al. | ......... | 709/246 |
| 2003/0093501 A1 * | 5/2003 | Carlson et al. | ................ | 709/220 |
| 2004/0019655 A1 * | 1/2004 | Uemura et al. | ................ | 709/217 |
| 2004/0059816 A1 * | 3/2004 | Takaoka et al. | ............... | 709/224 |
| 2004/0068561 A1 * | 4/2004 | Yamamoto et al. | ........... | 709/224 |
| 2005/0080982 A1 * | 4/2005 | Vasilevsky et al. | ............... | 711/1 |
| 2005/0091387 A1 * | 4/2005 | Abe | .............................. | 709/228 |
| 2005/0114474 A1 * | 5/2005 | Anderson et al. | ............. | 709/220 |
| 2008/0270608 A1 * | 10/2008 | Matsunami et al. | .......... | 709/225 |

FOREIGN PATENT DOCUMENTS

| | | |
|---|---|---|
| JP | 2001075853 | 3/2001 |
| JP | 2004118250 | 4/2004 |

* cited by examiner

*Primary Examiner* — Minh-Chau Nguyen
(74) *Attorney, Agent, or Firm* — Brundidge & Stanger, P.C.

(57) ABSTRACT

For use in a system where a plurality of servers are connected to an external disk device, a method is provided for a server to boot an operating system from the external disk device. The method includes the steps of searching for the port of a network switch to which the server is connected; establishing a network to which only the server and a management server belong; sending a server information acquisition program from the management server to the server via a network boot operation; acquiring, by the server information acquisition program, unique information owned by the storage interface of the server for transfer to the management server; and setting, by the management server, a disk within the external disk device accessible from the server based on the unique information.

12 Claims, 25 Drawing Sheets

FIG.4

SERVER MANAGEMENT TABLE

| SERVER IDENTIFIER | NETWORK CONNECTION PORT | PROCESSOR TYPE | MEMORY SIZE | BOOT DISK | VIRTUAL NETWORK |
|---|---|---|---|---|---|
| SERVER 1 | 1 | CPU1 | 1GB | LU1 | VLAN1 |
| SERVER 2 | 2 | CPU1 | 1GB | LU0 | VLAN1 |
| SERVER 3 | 3 | CPU2 | 2GB | LU0 | VLAN2 |
| SERVER 4 | 4 | CPU1 | 2GB | LU2 | VLAN3 |
| SERVER 5 | 5 | CPU2 | 1GB | — | — |
| SERVER 6 | 6 | CPU1 | 4GB | — | — |
| SERVER 7 | 7 | CPU2 | 1GB | — | — |
| SERVER 8 | 8 | CPU1 | 4GB | — | — |
| MANAGEMENT SERVER | 10 | CPU1 | 4GB | BUILT-IN DISK | — |

FIG.17

SERVER MANAGEMENT TABLE

| SERVER IDENTIFIER | NETWORK CONNECTION PORT | PROCESSOR TYPE | MEMORY SIZE | BOOT DISK | VIRTUAL NETWORK | WWN TO BE SET |
|---|---|---|---|---|---|---|
| SERVER 1 | 1 | CPU1 | 1GB | LU1 | VLAN1 | WWN1 |
| SERVER 2 | 2 | CPU1 | 1GB | LU0 | VLAN1 | WWN2 |
| SERVER 3 | 3 | CPU2 | 2GB | LU0 | VLAN2 | WWN3 |
| SERVER 4 | 4 | CPU1 | 2GB | LU2 | VLAN3 | WWN4 |
| SERVER 5 | 5 | CPU2 | 1GB | — | — | WWN5 |
| SERVER 6 | 6 | CPU1 | 4GB | — | — | WWN5 |
| SERVER 7 | 7 | CPU2 | 1GB | — | — | WWN6 |
| SERVER 8 | 8 | CPU1 | 4GB | — | — | WWN7 |
| MANAGEMENT SERVER | 10 | CPU1 | 4GB | BUILT-IN DISK | — | — |

401  402  403  404  405  406  1701

STORAGE MANAGEMENT TABLE

| CONNECTION DEVICE IDENTIFIER (2301) | FC SWITCH CONNECTION PORT (2302) | DEVICE TYPE (2303) |
|---|---|---|
| SERVER 1 | 1 | SERVER |
| SERVER 2 | 2 | SERVER |
| SERVER 3 | 3 | SERVER |
| SERVER 4 | 4 | SERVER |
| DISK 1 | 5 | DISK |
| DISK 2 | 6 | DISK |
| DISK 3 | 7 | DISK |
| DISK 4 | 8 | DISK |

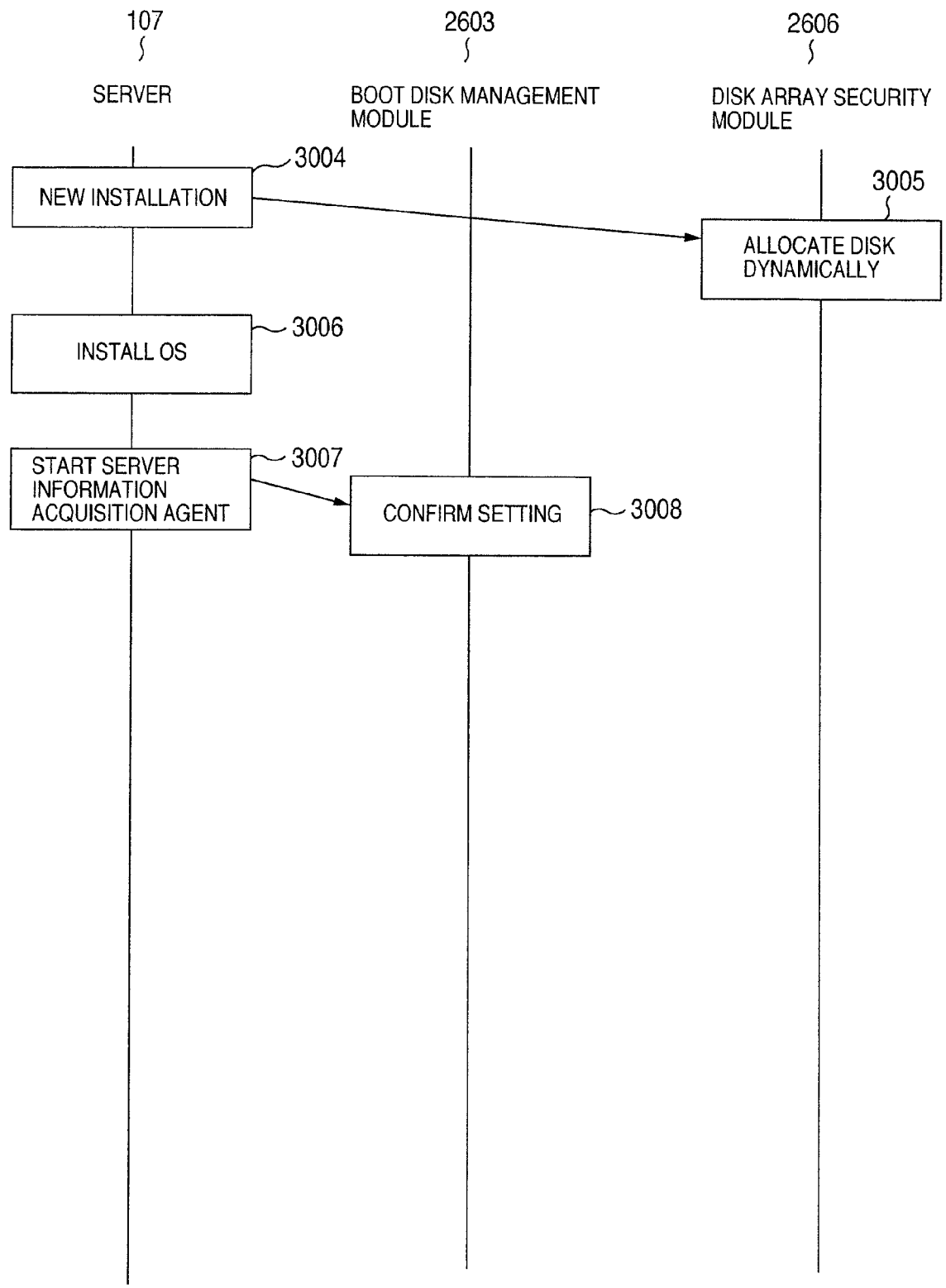

METHOD OF BOOTING AN OPERATING SYSTEM

CROSS-REFERENCED TO RELATED APPLICATION

The present application is a continuation of application Ser. No. 11/007,339, filed Dec. 9, 2004 now U.S. Pat. No. 7,509,401, which claims priority from Japanese application JP2004-251215 filed on Aug. 31, 2004, the content of which is hereby incorporated by reference into this application.

BACKGROUND OF THE INVENTION

The present invention relates to a disk management method used in a server that boots an operating system from an external disk.

In general, in a server system having disk devices, the operating system of the server is installed on the boot disk, one of the disk devices and, when the server is started, the boot disk is detected to boot the operating system.

One of the prior art technologies is that the system is booted from a fixed disk built in the server. According to this prior art, a disk device on which the operating system is to be installed is provided in the server in advance, and the operating system is installed on that disk for booting the server. In this case, only one boot disk is prepared for the server and, in addition, the boot disk is not shared with other servers.

Therefore, this prior art technology reduces the chance of other servers referencing or updating the boot disk, thus ensuring high security. Another boot method is that an external disk array device is used for booting. A disk array device, with a large storage capacity, can be connected to a plurality of servers via a fiber channel or a fiber channel switch. Booting an operating system from an external disk such as a disk array device has a security problem. A disk array device is basically like a network; that is, all servers connected to a disk array device can reference or update the disks in the disk array device. Therefore, there is a possibility that some other server alters the boot disk or references its contents.

To solve this problem, a disk array device uses a unique device identifier WWN (World Wide Name), an identifier owned by a fiber channel device, to implement a function that associates the WWN of a particular server with a disk in the disk array device. For example, a disk array device has an access range limiting function that allows server 1 with the name of WWN1 to access only disk 1 included in the disk array device. This function can maintain the security of the disks among servers. However, because a WWN is an identifier recorded in the fiber channel adapter in a server, the operating system must be started and a program (agent) for acquiring the WWN must be started to acquire the WWN. Therefore, because the WWN is not yet determined when the operating system is installed, the security function of the disk array device cannot be used until the operating system is installed and then the agent is started to acquire the WWN. This means that there is a period during which the security is low.

One alternative method is to investigate the WWN of a server before installing an operating system and to set up the security function of the disk array device. However, this method sometimes generates an error because a manual operation is involved and, in addition, requires time for setting up the function for many servers. On the other hand, a technology for acquiring a WWN without using an agent is disclosed in U.S. Patent Application Publication No. 2004/0059816A1 and the corresponding Japanese patent application JP-A-2004-118250. This method acquires the WWN of an accessed device of a disk array device to obtain information on the connection relation of the fiber channel. A problem with this method is that the relation between a server and a WWN is unknown and therefore the method cannot be used when an operating system is installed into a server.

SUMMARY OF THE INVENTION

It is an object of the present invention to maintain high security and to reduce the efforts to manage the server operation even in a boot system, in which an external disk device is used, by using the security function of the disk array in advance, when an operating system is installed on an external disk device such as a disk array device.

For use in a system where a plurality of servers are connected to an external disk device, the present invention provides a method for a server to boot an operating system from the external disk device. The method includes the steps of searching for the port of a network switch to which the server is connected; establishing a network to which only the server and a management server belong; sending a server information acquisition program from the management server to the server via a network boot operation; acquiring, by the server information acquisition program, unique information owned by the storage interface of the server for transfer to the management server; and setting, by the management server, a disk within the external disk device accessible from the server based on the unique information.

A method of booting an operating system according to the present invention has the advantage of setting up the security of an external disk device before installing the operating system and automatically acquiring information necessary for setting up the security.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing a server management table in the first embodiment.

FIG. 17 is a diagram showing a server management table in the second embodiment.

FIG. 30 is a diagram showing the sequence of the operation in the fourth embodiment.

DESCRIPTION OF THE EMBODIMENTS

First Embodiment

Figure 1:
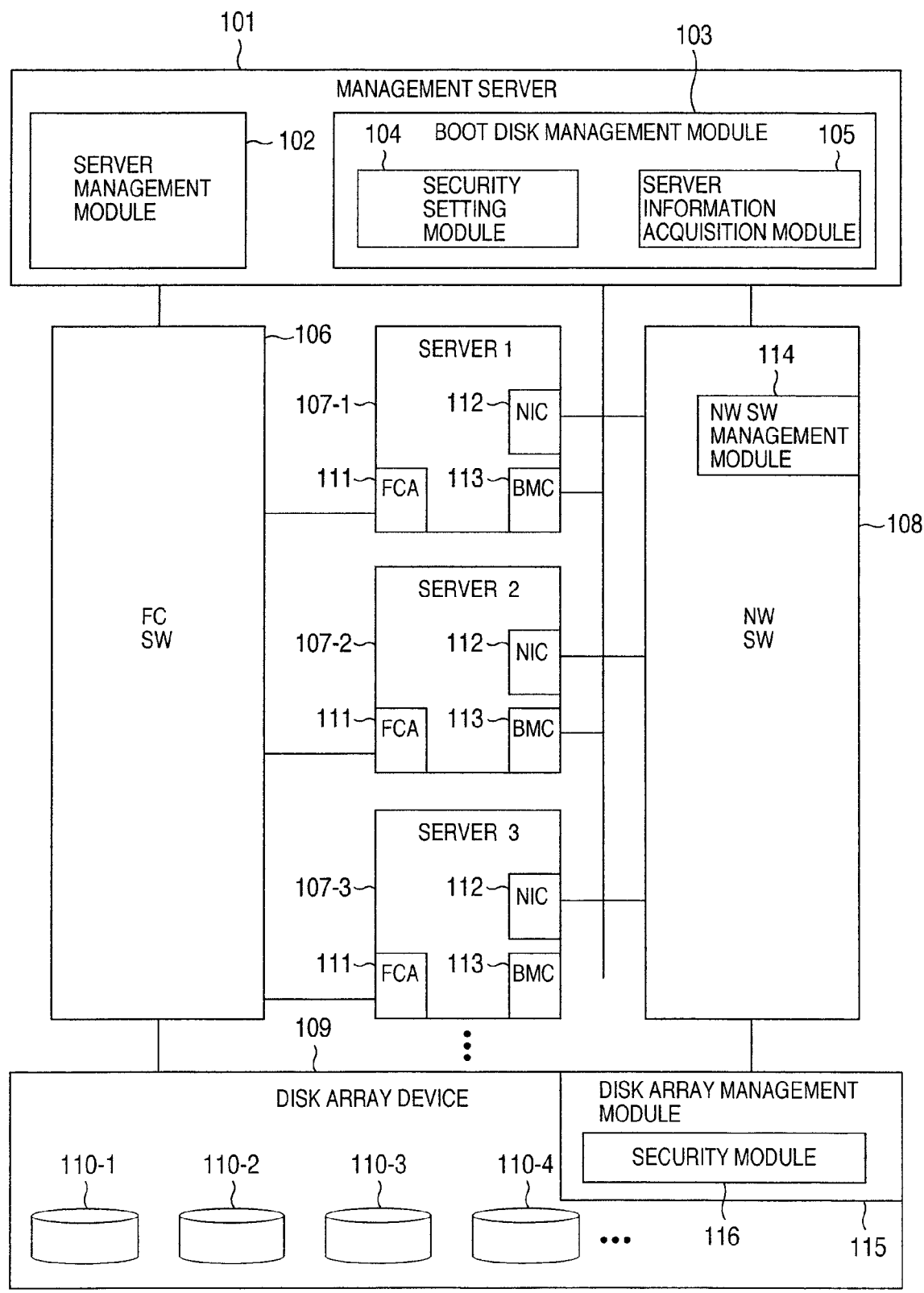
FIG. 1 is a diagram showing the general configuration of a first embodiment of a computer system in which a boot disk management method according to the present invention is executed.
Figure 3:
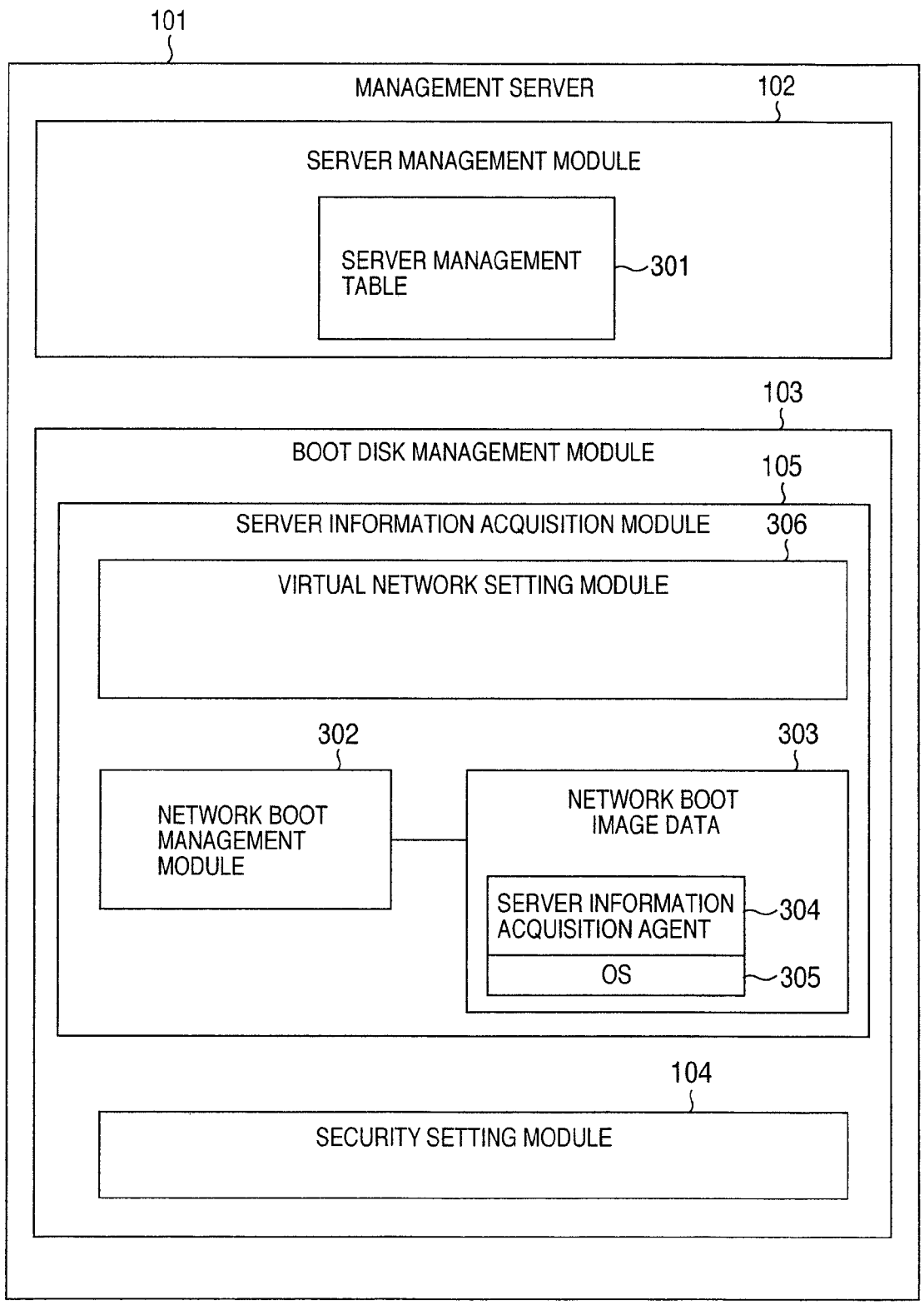
FIG. 3 is a diagram showing the configuration of a management server in the first embodiment.

FIG. 1 is a general diagram of a computer system in which a method of booting an operating system according to the present invention is used. Each of a plurality of servers 107-1, 107-2, 107-3, - - - is connected to a network switch (NW SW) 108 via a network interface card (NIC) 112, and to a fiber channel switch 106 via a fiber channel adapter (FCA) 111. One of the servers 107-1, 107-2, 107-3, - - - is represented by numeral 107 hereinafter. Although three servers 107 are shown in FIG. 3, the number of servers is not limited to three but may be three or more. The fiber channel switch 106 is connected also to a disk array device 109 to allow the server 107 to access it. The network switch 108 is connected also to a management server 101 that manages the system. Each of the servers 107 contains a BMC (Baseboard Management Controller) 113 for monitoring the status of the hardware of the server 107, for controlling the power supply, and for resetting the server 107 via a network. In general, a power separate from that of the server 107 is supplied to the BMC 113 to allow the BMC 113 to be remotely controlled via a network even when the server 107 stops. The management server 101 monitors the status of, and controls, the server 107, the network switch 108, the fiber channel switch 106, and the disk array device 109 as necessary via a network.

The management server 101 comprises a server management module 102 and a boot disk management module 103. The server management module 102 manages servers as well as the devices connected to the servers. The boot disk management module 103, a module for managing disks necessary for booting servers, is one of the modules that characterize the present invention. The boot disk management module 103 comprises a security setting module 104 and a server information acquisition module 105. The security setting module 104 is a module for controlling a disk array management module 115 included in the disk array device 109; more specifically, the disk array management module 115 controls the security module 116 to establish the relation between a server and one or more disks 110-1, 110-2, 110-3, 110-4, - - - in the disk array 109. One of the disks is represented by numeral 110 hereinafter. The server information acquisition module 105, which is a module for acquiring information regarding the servers, has a function to control a network switch management module 114 and so on in the network switch 108 for acquiring information on the servers 107.

In this embodiment, when the operating system of the server 107 is stored in the disk array device 109, the server 107 associates the server 107 with a disk 110 in the disk array device 109 before installing the operating system.

Figure 2:
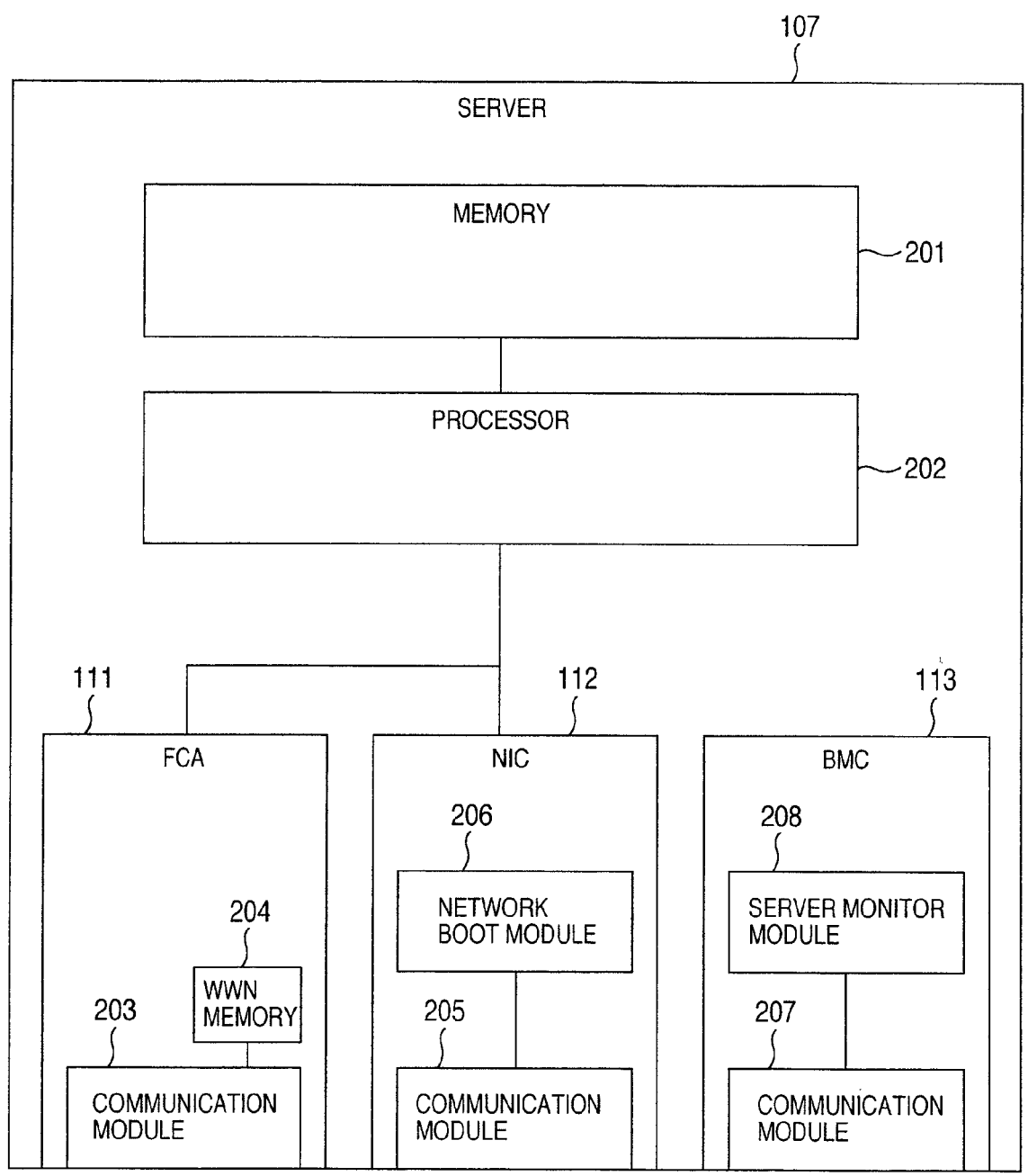
FIG. 2 is a diagram showing the configuration of a server in the first embodiment.

FIG. 2 is a diagram showing the detailed configuration of the server 107 in this embodiment. The server 107 comprises a memory 201 in which programs and data are stored, a processor 202 that executes programs in the memory, the fiber channel adapter 111, the network interface card 112, and the BMC 113. The fiber channel adapter 111 uses a communication module 203 to carry out fiber channel communication that requires a unique device identifier called a WWN (World Wide Name). The WWN identifies the other end of the fiber cannel communication. The fiber channel adapter 111 contains a WWN storage memory 204 in which the WWN is stored, and the communication module 203 carries out communication while referencing the WWN storage memory 204.

The network interface card 112 comprises a communication module 205 that carries out network communication and a network boot module 206. The network boot module 206, which is started when the server 107 is booted, has a function to acquire programs via the network for booting the server 107. The BMC 113 mainly monitors and controls the hardware of the server 107. The BMC 113 transfers hardware information on the server, and accepts and transfers control commands, via a communication module 207. It is possible to use a general network communication device as the communication module 207. When an error occurs in the hardware of the server 107, a server monitor module 208 detects the error and notifies the error via the communication module 207. The power (not shown) of the server 107 can be turned on/off, and the hardware can be reset, remotely via the communication module 207. To implement this function, a power (not shown) separate from the power of the server 107 is usually supplied to the BMC. Therefore, even if the power of the server is off, the BMC 113 can be remotely controlled via the communication module 207.

FIG. 3 is a diagram showing the configuration of the management server 101 shown in FIG. 1. The management server 101 comprises the server management module 102 and the boot disk management module 103. The server management module 102 monitors the status of, and controls, the server. For example, the server management module 102 monitors an event indicating whether the currently running server is normally running or an event of a newly added server. In this case, the important information is about what servers are being managed. To keep track of this information, the server management module 102 has a server management table 301. The server management table 301 contains configuration information and setting information on the servers being monitored or controlled. The detail of the server management table 301 will be described later. The boot disk management module 103 comprises the server information acquisition module 105 and the security setting module 104. The server information acquisition module 105 comprises a virtual network setting module 306 and a network boot management module 302. The virtual network setting module has a function to build a virtual network (VLAN) in the network switch 108 shown in FIG. 1.

A virtual network is a function to logically divide the devices, physically connected to the same network switch, into a plurality of networks. The virtual network setting module 306 in this embodiment builds a private network between a server being controlled and the management server. The network boot management module 302 performs processing corresponding to the network boot module 206 shown in FIG. 2. In response to a request from the network boot module 206, the network boot management module 302 transfers network boot image data 303 and information necessary for the network boot operation. The network boot image in this embodiment contains an operating system (OS) 305 and a server information acquisition agent 304 running on the OS. The server information acquisition agent 304 is set up in such a way that, when an OS 305 is booted, the server information acquisition agent 304 starts the operation automatically. The security setting module 104 controls the security module 116 of the disk array device 109 to associate a server with a disk.

FIG. 4 shows the details of the server management table 301 shown in FIG. 3. The server management table 301, a table managed by the management server 101, contains a list of servers managed by the management server 101 as well as the management information on the servers. A column 401 of the table contains the identifier of a server. The server identifier 401 may be any information by which a server can be identified. The identifier is the serial number of the server or, if the server is a blade server, the blade number of the server. A column 402 indicates a network connection port number. This number indicates the connection relation between the server 107 and the network switch 108. This number may be set by the system manager if the server is an independent server or may be set as fixed information if the connection status is determined in advance as for a blade server.

In this embodiment, either method may be used for setting network connection port numbers. A column 403 indicates the processor type of the server. A column 404 indicates the size of memory installed in the server. A column 405 indicates the location of the boot disk. "Built-in disk" is entered in this column to indicate that the OS is booted from a disk built in the server, while a disk number is entered to indicate that the OS is booted from an external disk array device. When there are multiple disk array devices, the device number may be entered. A column 406 contains the identifier of a virtual network. When two or more servers have the same virtual network identifier, they belong to the same network; when two or more servers have different virtual network identifiers, the communication among them is logically disconnected.

Figure 5:
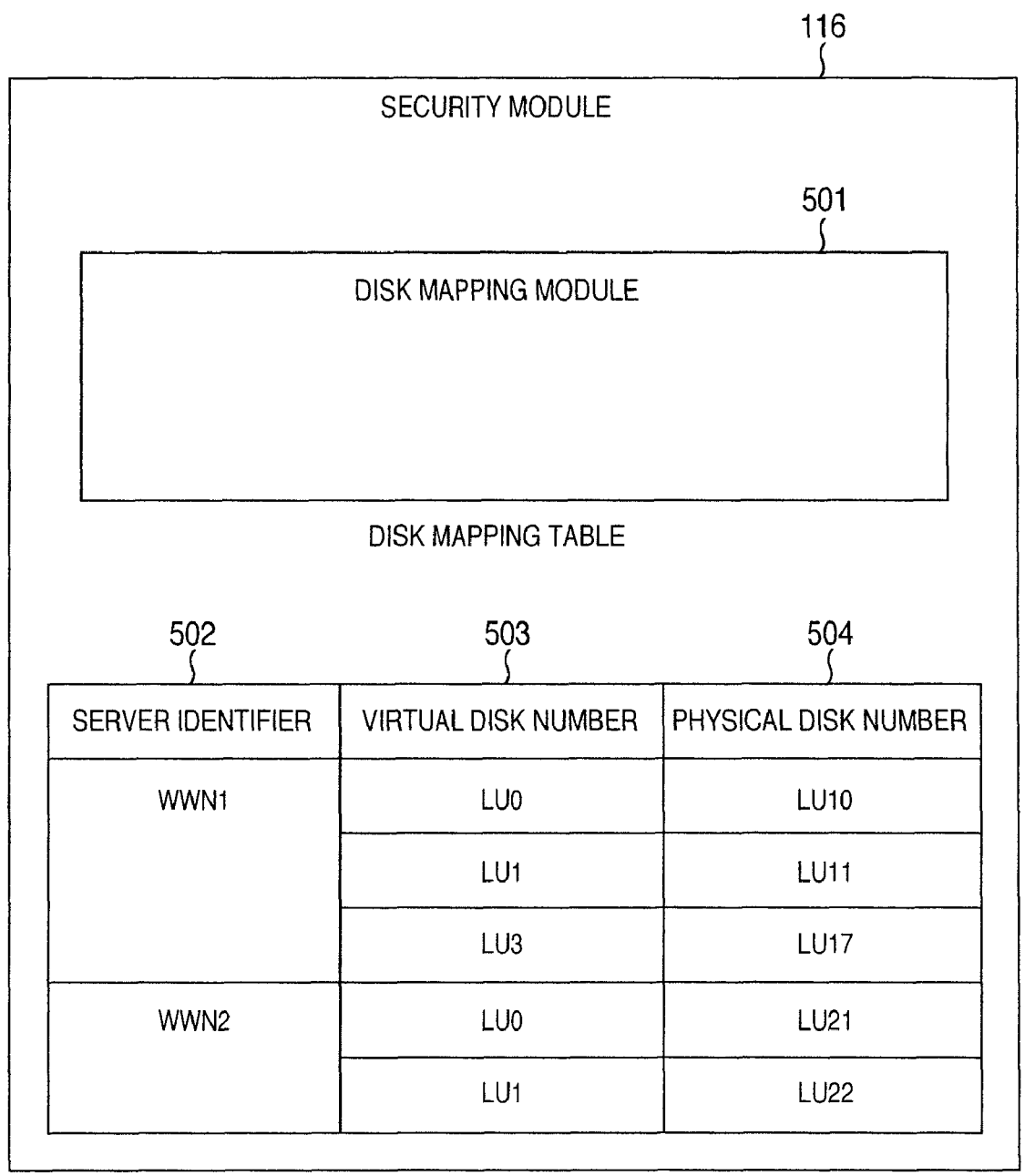
FIG. 5 is a diagram showing the configuration of a security module in the first embodiment.

FIG. 5 is a diagram showing the details of the security module 116 of the disk array device 109 in this embodiment. The security module has a function to associate a server with a disk. In a case where a large disk such as a disk array device is used, many servers are connected to the same disk array device. In such a case, this module limits the disks that can be referenced and updated by a server in order to protect the security of data stored in the disks. More specifically, the security module 116 comprises a disk mapping module 501 and a disk mapping table (502, 503, 504). When a server 107 accesses disks, the disk mapping module 501 limits the disks that can be accessed by the server 107 according to the disk mapping table (502, 503, 504). A column 502 contains the identifier of the server 107, that is, the WWN described above.

A column 503 contains virtual disk numbers, and a column 504 contains physical disk numbers. For example, when access is made from the fiber channel adapter 111 with the name of WWN1, the disk mapping function allows access to the virtual disk numbers (LU0, LU1, LU3). The virtual disk numbers (LU0, LU1, LU3) actually correspond to the physical disks (LU10, LU11, LU17). In this way, the security module allows a specific server to access limited disks that are virtual. The module inhibits access to the disks if access is made from a WWN not stored in the disk mapping table 502.

Figure 6:
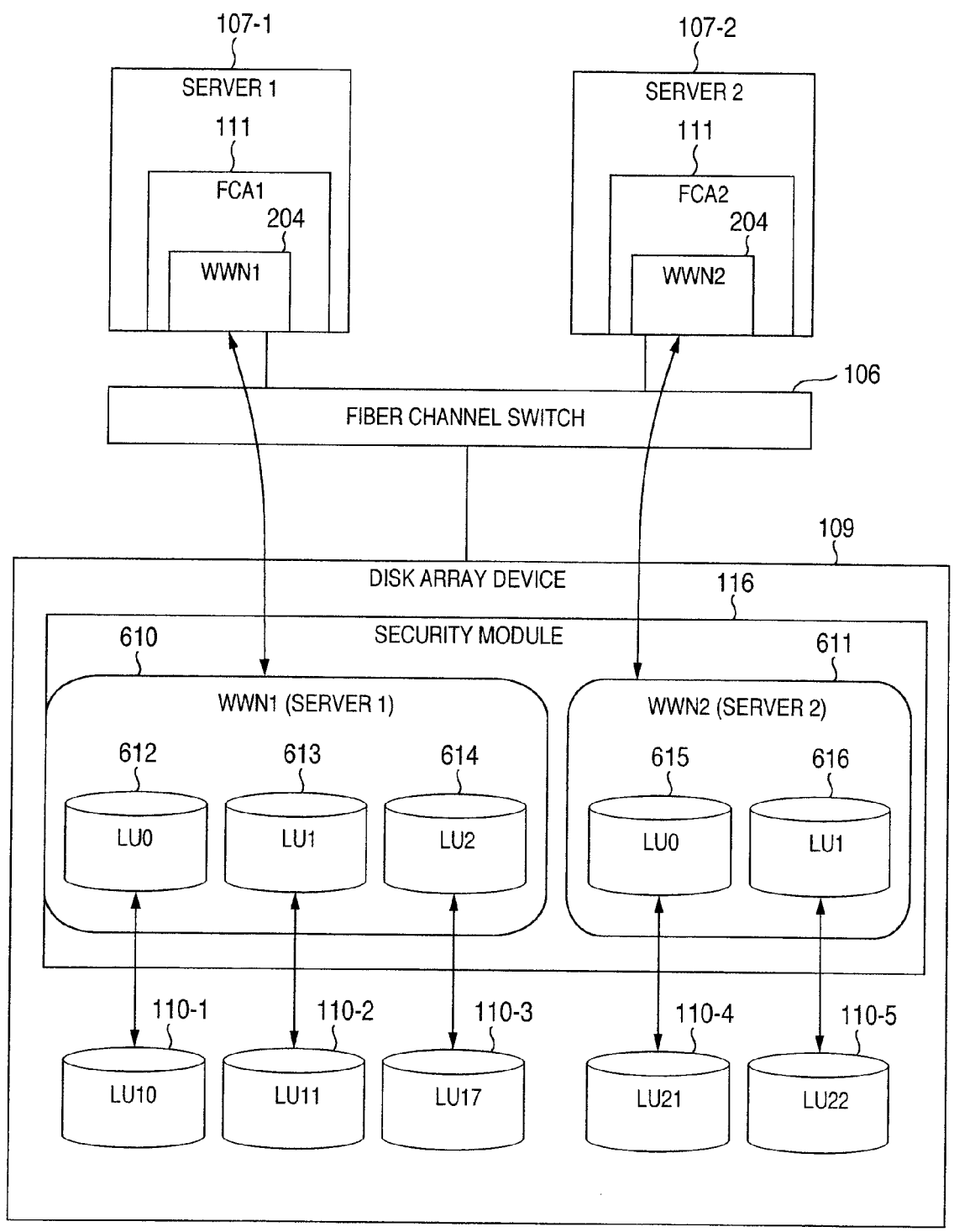
FIG. 6 is a diagram showing an example of the security module setup in the first embodiment.

FIG. 6 is a block diagram showing the operation of the security module 116 in FIG. 5. Server 1 (107-1) has a fiber channel adapter 111 to which WWN1 stored in memory 204 is given. Server 2 (107-2) has a fiber channel adapter 111 to which WWN2 stored in memory 204 is given. Server 1 (107-1) and server 2 (107-2) are connected to a fiber channel switch 106, which is connected to a disk array device 109. A security module 116 allows server 1 (107-1) to access virtual disks LU0 (612), LU1 (613), and LU2 (614) corresponding to physical disks LU10 (110-1), LU11 (110-2), and LU17 (110-3). On the other hand, the security module 116 allows server 2 (107-2) to access virtual disks LU0 (615) and LU1 (616) corresponding to physical disks LU21 (110-4) and LU22 (110-5). Server 1 (107-1) cannot access physical disks LU21 (110-4) and LU22 (110-5). Server 1 (107-1) and server 2 (107-2) correspond to the server 107 in FIG. 1. Blocks 610 and 611 in the security module 609 correspond to the disk mapping table 502 to 504 in FIG. 5. The numeral 610 indicates the logical disks allocated to the server with the identifier WWN1 in the disk mapping table (FIG. 5). The numeral 611 indicates the logical disks allocated to the server with the identifier WWN2.

Figure 7:
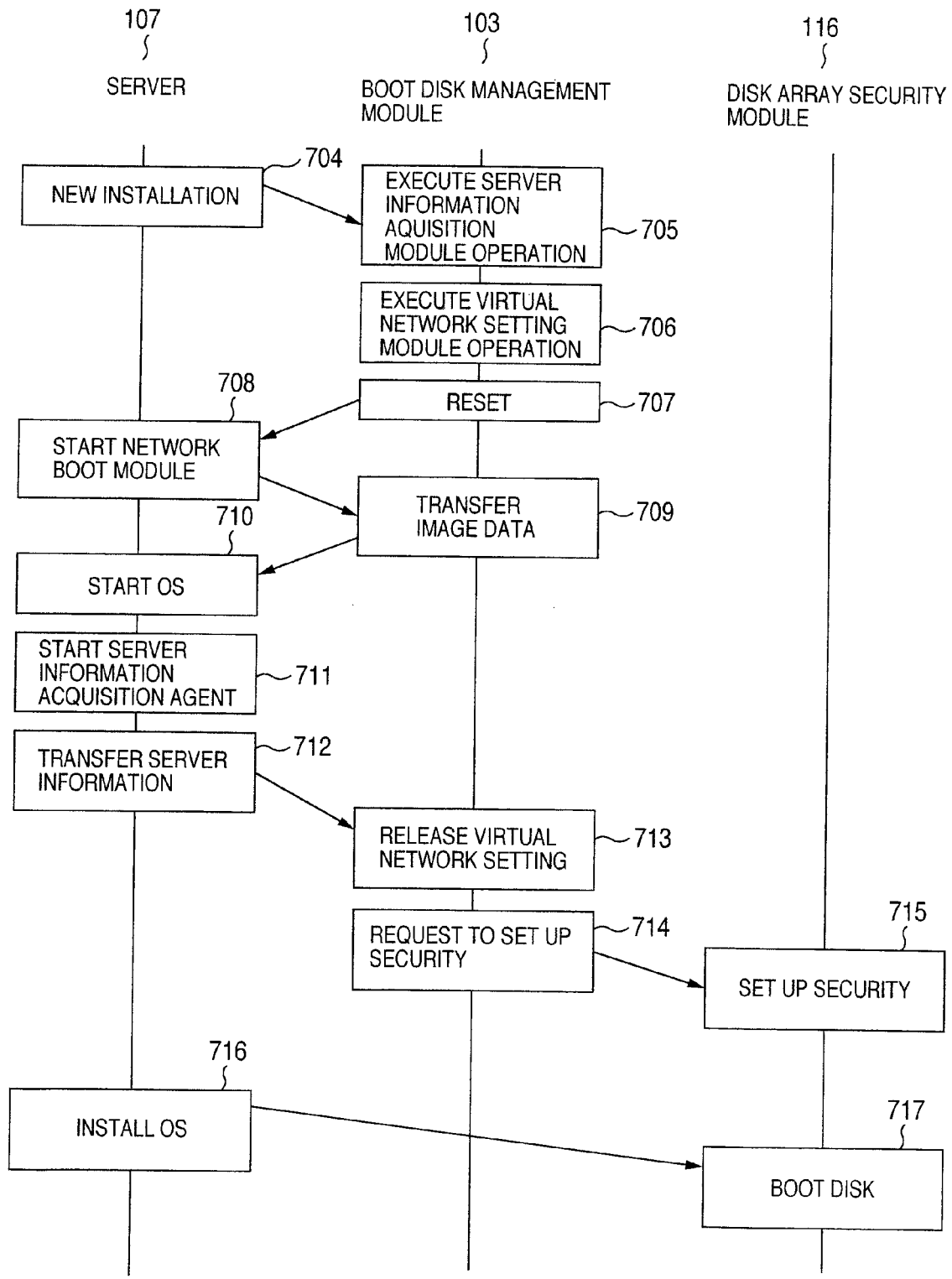
FIG. 7 is a diagram showing the sequence of the operation in the first embodiment of the present invention.

FIG. 7 shows the operation sequence of the first embodiment of the present invention. The figure shows the sequence of operations performed by a server 107, a boot disk management module 103, and a disk array security module 116. Step 704 indicates the issuance of an installation event of a new server into a computer system. For example, in a blade server, an event is issued automatically when a new server blade is installed. For a single-unit server, it is also possible for the system manager to manually issue an event after the server is connected to the network switch. This sequence is applicable also to an event generated in a case in which a new server is not installed but an already installed server, which is not yet set up, is put into use. The event described here is an event that is generated when a server, for which no disk is yet determined for installing the OS, is newly used. This event, when generated, causes the server information acquisition module 105 of the boot disk management module 103 to start the operation (step 705). The server information acquisition module 105 analyzes the event and, if it is determined that a new server is installed, calls the virtual network setting module 306 (step 706). The virtual network setting module 306 builds a private network between the newly installed server and the management server.

After that, a reset instruction is transferred to the server 107 (step 707). When the server 107 is reset by the reset instruction, the above-described network boot module of the server 107 starts the operation (step 708). This causes image data to be transferred from the boot disk management module 103 (step 709). The server 107 uses the transferred image data to start booting the OS (step 710). At the same time the OS is booted, the server information acquisition agent is started automatically (step 711), which acquires various server information and transfers the acquired information to the boot disk management module 103 (step 712). This information includes the WWN of the fiber channel adapter of the server. After confirming that the server information is transferred, the boot disk management module 103 releases the virtual network built by the virtual network setting module in step 706 to return the network status to the status before the boot disk management module 103 was started (step 713). After that, the security setting module 104 uses the WWN, included in the acquired server information, to request the security module 116 of the disk array device to associate the server 107 with the disk 110 (step 714). By executing the sequence of processing steps described above, the disk on which the OS is installed is automatically prepared for the newly installed server. Then, the installation of the OS can be started (step 716).

Figure 8:
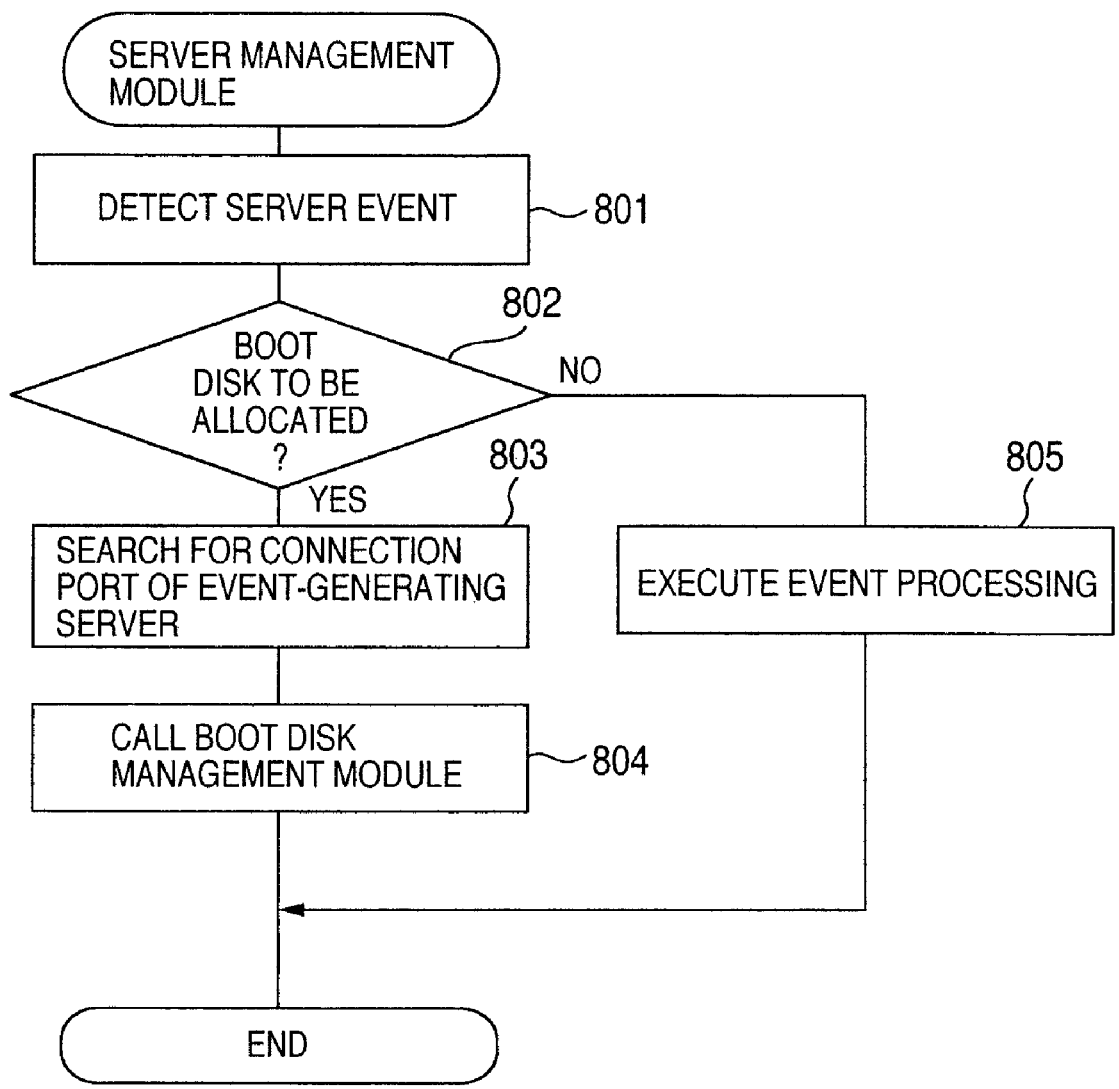
FIG. 8 is a flowchart showing the processing of a server management module in the first embodiment.

The following describes the sequence, shown in FIG. 7, more in detail. FIG. 8 is an operation flowchart of the server management module 102. In step 801, a server event is detected. In step 802, the event is analyzed and whether or not a boot disk is to be allocated to the event is determined. If it is found that a boot disk is to be allocated, the server management module searches for the network connection port of the event-generating server in step 803. This is done by searching the server management table shown in FIG. 4. In step 804, the boot disk management module is called. In this case, the connection port number, acquired in step 803, is transferred as the parameter. If it is found in step 802 that a boot disk need not be allocated, the processing for the event is performed in step 805 and the flow is ended.

Figure 9:
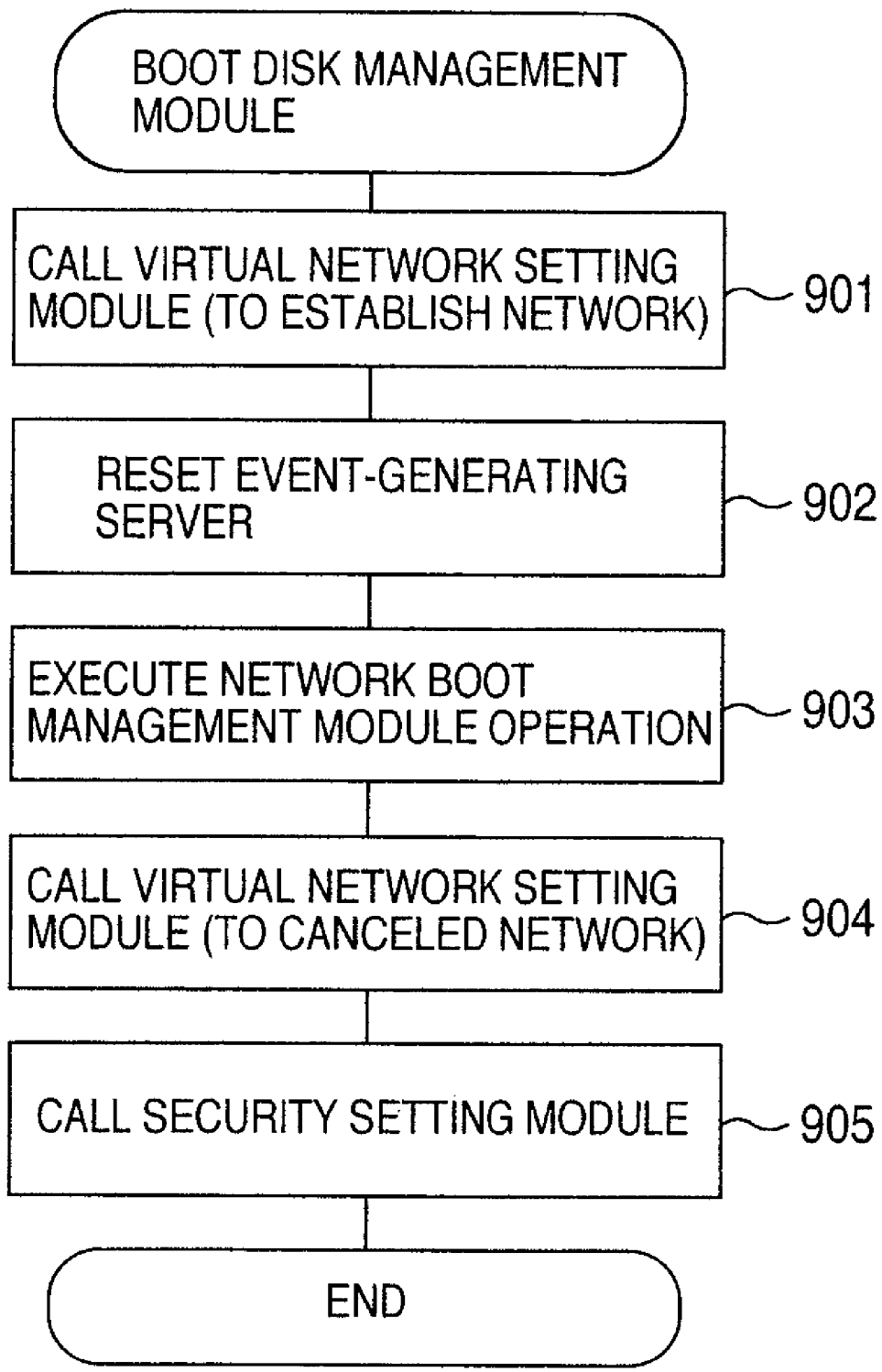
FIG. 9 is a flowchart showing the processing of a boot disk management module in the first embodiment.

FIG. 9 is a flowchart showing the processing of the boot disk management module 103. In step 901, the virtual network setting module 306 is called. The virtual network setting module 306 has a function to build a new virtual network and a function to release a virtual network that is already built. In step 901, a new virtual network is built. By performing the processing of step 901, a private virtual network is established between the event-generating server 107 and the management server 101 on a one-to-one basis. In step 902, a reset instruction is sent to the event-generating server 107. The reset instruction is issued to the BMC 113, and the BMC of the server that receives this instruction resets the server. Once reset, the server starts searching for a boot disk. However, the OS disk is not yet determined in this embodiment, the network boot module 206 is given priority to start the operation. At the same time the network boot module 206 starts the operation, the network boot management module 302 starts the operation. This operation will be described later. The network boot management module 302 acquires the WWN of the event-generating server. In step 904, the private network established in step 901 is canceled to return to the original status. In step 905, the security setting module 104 is called with the WWN, acquired in step 903, as the parameter.

Figure 10:
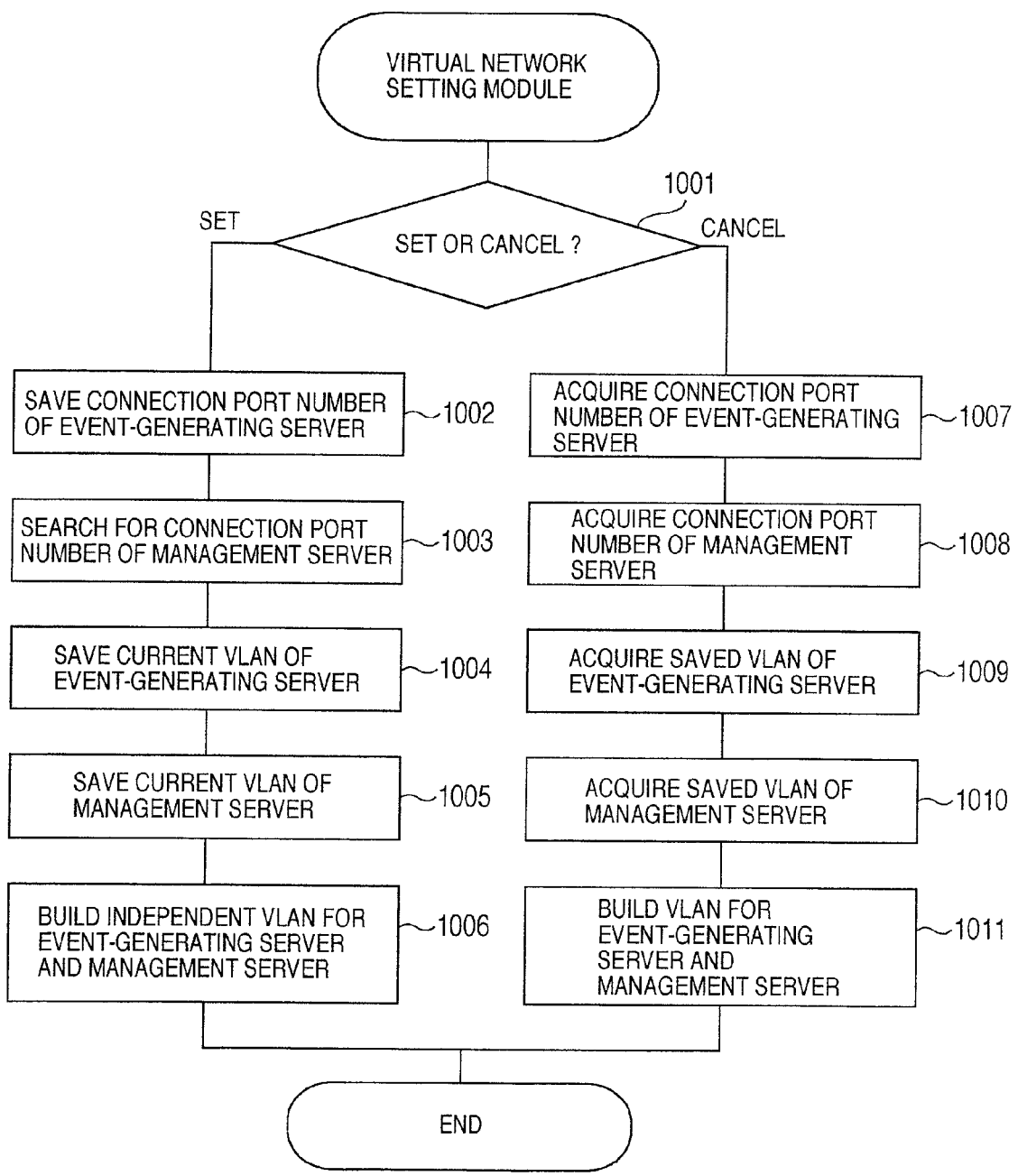
FIG. 10 is a flowchart showing the processing of a virtual network setting module in the first embodiment.

FIG. 10 is a flowchart showing the operation of the virtual network setting module 306. In step 1001, whether the requested instruction is to build a virtual network or to release a virtual network is determined. When a virtual network is to be built, control is passed to step 1002; when a virtual network is to be released, control is passed to step 1007. In step 1002, the current connection port number of the event-generating server is saved. In step 1003, the virtual network setting module searches for the connection port number of the management server. In step 1004, the current virtual network (VLAN) number of the event-generating server is saved. This saved number is used to release the virtual network. The current VLAN number can be found by referring to the server management table in FIG. 4.

In step 1005, the current VLAN number of the management server is saved. In step 1006, a VLAN independent of other VLANs is built for the event-generating server and the management server. The information used in this case is the connection port numbers of the server and the management server. The virtual network setting module 306 instructs the management module 114 of the network switch 108 to connect the device, connected to the specified port number, to the specified VLAN. An independent VLAN number is found, for example, by searching the virtual network column 406 of the server management table in FIG. 4 for a VLAN number that is not set. Alternatively, it is also possible to determine a predetermined VLAN number in advance and inhibits the VLAN number from being used by others.

When a virtual network is to be canceled, the connection number of the event-generating server is acquired in step 1007. In step 1008, the connection port number of the management server is acquired. In step 1009, the VLAN number saved in step 1004 is acquired. In step 1010, the VLAN number saved in step 1005 is acquired. Based on the information acquired in the above steps, the VLAN numbers of the event-generating server and the management server are reset to the original status in step 1011. Building a virtual network prevents an incorrect operation that might be caused when a server other than the management server 101 reacts to the network boot module 206 and, in addition, eliminates an influence on the networks of other servers.

Figure 11:
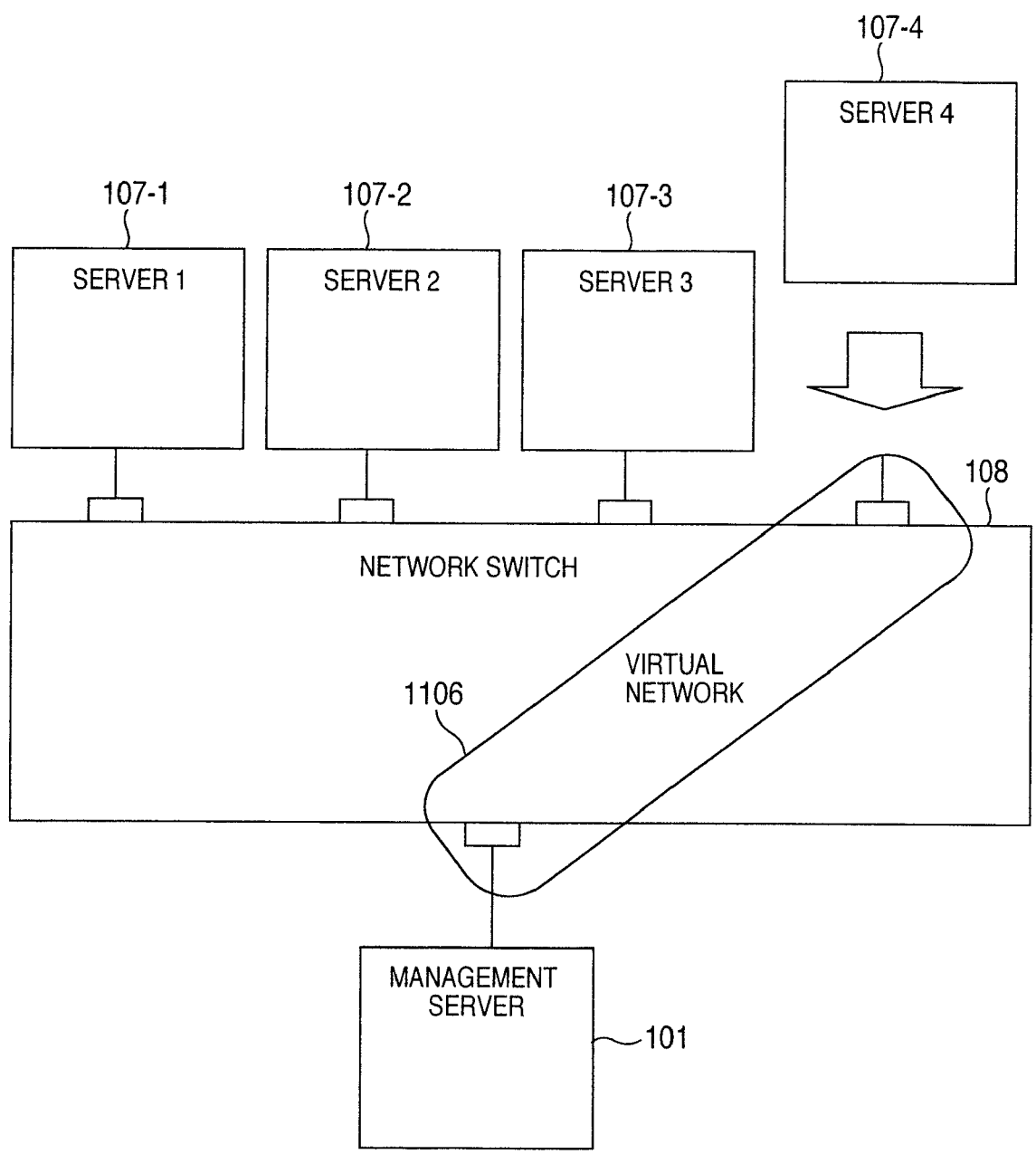
FIG. 11 is a diagram showing an example of a virtual network setup in the first embodiment.

FIG. 11 shows an example of a virtual network built by the virtual network setting module 306 according to the flowchart in FIG. 10. Servers 107-1, 107-2, and 107-3 are each connected to a network switch 108. In this case, when a server 107-4 is newly installed, an independent virtual network 1106 is automatically configured for a management server 101 and the installed server 107-4. Although a VLAN is used to build a virtual network in this embodiment, a network other than a VLAN can be used to reduce an effect on the networks of other servers. For example, it is possible to directly control the control hardware of the network switch 108 to build a virtual network on a hardware level. This enables a completely independent network to be built between the server 107-4 and the management server, thus preventing a request, issued from the server 107-4 and transferred via the network, from affecting other servers during the processing.

Figure 12:
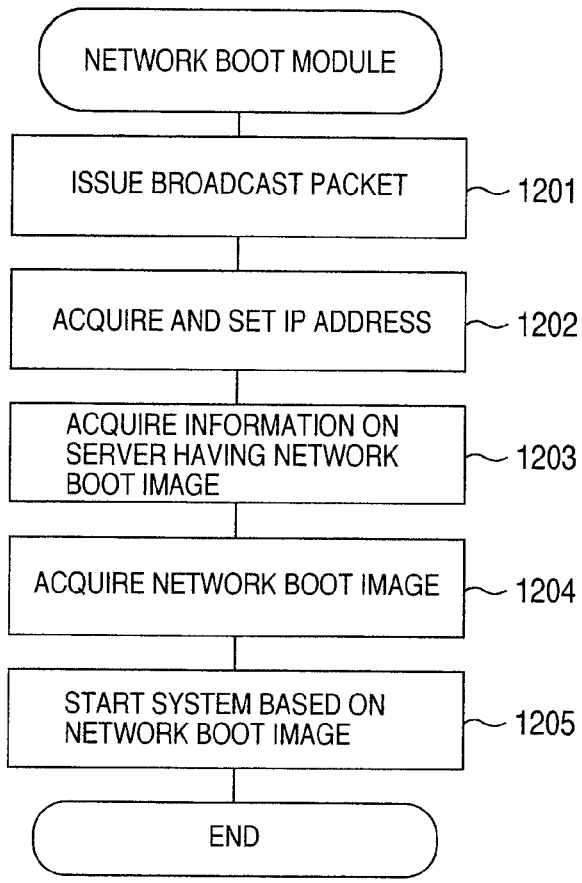
FIG. 12 is a flowchart showing the processing of a network boot module in the first embodiment.

FIG. 12 is a flowchart showing the processing of the network boot module 206. In step 1201, the network boot module 206 issues a broadcast packet to the connected network. This packet is issued to acquire an IP address. Immediately after the power of the server 107 is turned on, the server does not have an IP address (network address) and therefore cannot communicate with other devices via the network using an IP address. In this embodiment, a broadcast packet, if issued, is delivered only to the management server 101 because a virtual network is built. This makes it possible to manage a newly installed server without affecting other servers. The server managing the IP addresses returns an IP address in response to the broadcast packet. In step 1202, the network boot module 206 receives an IP address and sets the IP address in the network interface card. In step 1203, the information identifying the server having the data necessary for booting is received. In step 1204, the image data is received from the server whose information is received in step 1203. In step 1205, the system is booted based on the acquired image data. By executing the sequence of processing steps described above, the system can be booted via the network. The image data refers to a file in which the programs and data necessary for booting the operating system is stored. The server that receives the image data expands its contents into the memory to set up the environment for executing the operating system.

Figure 13:
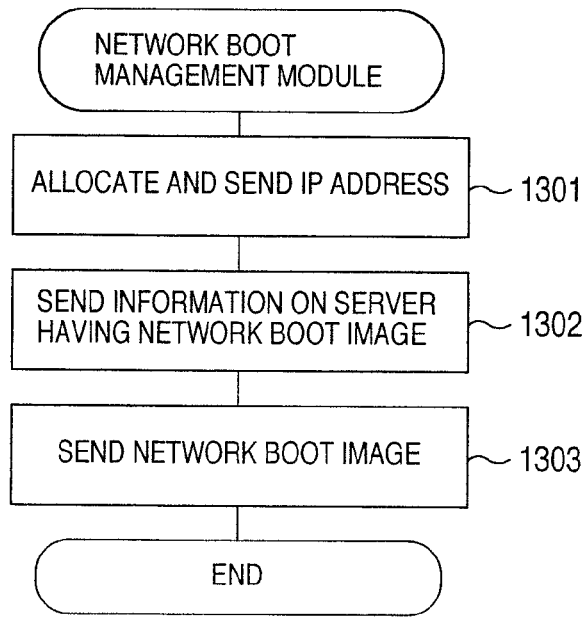
FIG. 13 is a flowchart showing the processing of a network boot management module in the first embodiment.

FIG. 13 shows the processing flow of the network boot management module 302 of the management server side that corresponds to the processing flow of the network boot module 206 in FIG. 12. In step 1301, the network boot management module 302 allocates an IP address in response to a broadcast packet. In step 1302, the information on the server having the image data is sent; in this embodiment, the management server 101 is a server that has the image data. In step 1303, the network boot image is sent. By performing the above processing, the system can be booted via the network.

Figure 14:
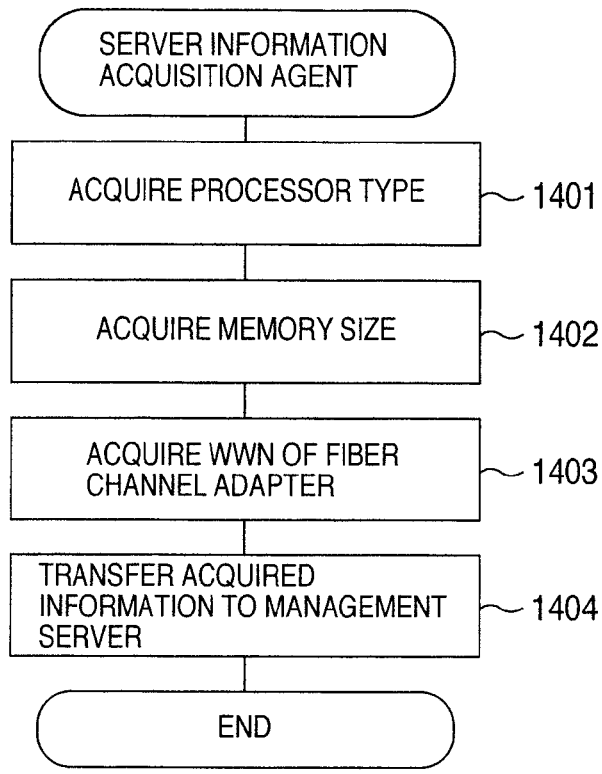
FIG. 14 is a flowchart showing the processing of a server information acquisition agent in the first embodiment.

FIG. 14 shows the processing flowchart of the server information acquisition agent 304. This processing is started automatically when the system is booted via the network in FIG. 12 and FIG. 13. In step 1401, the processor type information is acquired. In step 1402, the memory size information is acquired. In step 1403, the WWN of the fiber channel adapter is acquired. In step 1404, the acquired information is transferred to the management server 101. The sequence of the processing steps is prepared so that, after the OS 305 is booted via the network boot operation, the server information acquisition agent 304 is started automatically to perform its processing.

Figure 15:
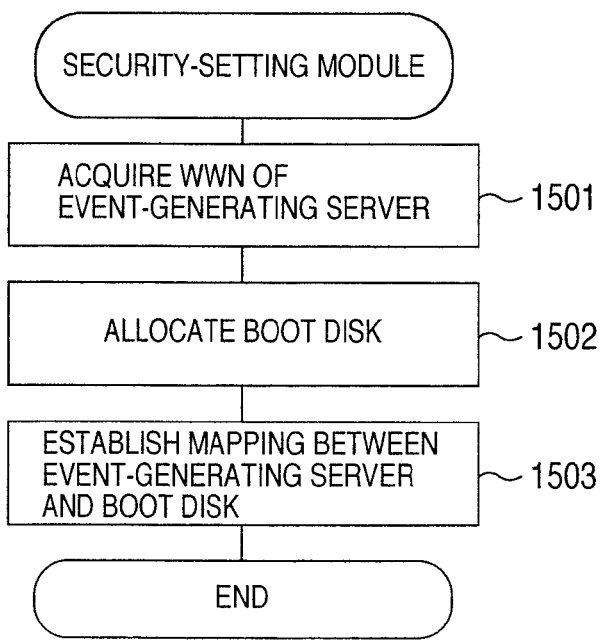
FIG. 15 is a flowchart showing the processing of a security setting module in the first embodiment.

FIG. 15 shows the processing flow of the security setting module 104. In step 1501, the WWN of the event-generating server is acquired. This is done by receiving the WWN acquired in step 1403 in FIG. 14. In step 1502, a boot disk to be newly allocated to the event-generating server is created. In this step, it is possible to request the creation of a new disk in the disk array or, alternatively, to reserve a plurality of boot disks in advance and acquire a boot disk from the reserved boot disks. In step 1503, a request is issued to associate the event-generating server with the boot disk allocated in step 1502 with the WWN acquired in step 1501 as the parameter. The security module 116 processes this request. By performing the above processing, a new disk is associated with the server and the disk is prepared for installing the OS thereon. Although the present invention is used for allocating a boot disk in this embodiment, the same procedure can be used not only for allocating a boot disk but also for allocating a data disk.

Second Embodiment

Figure 16:
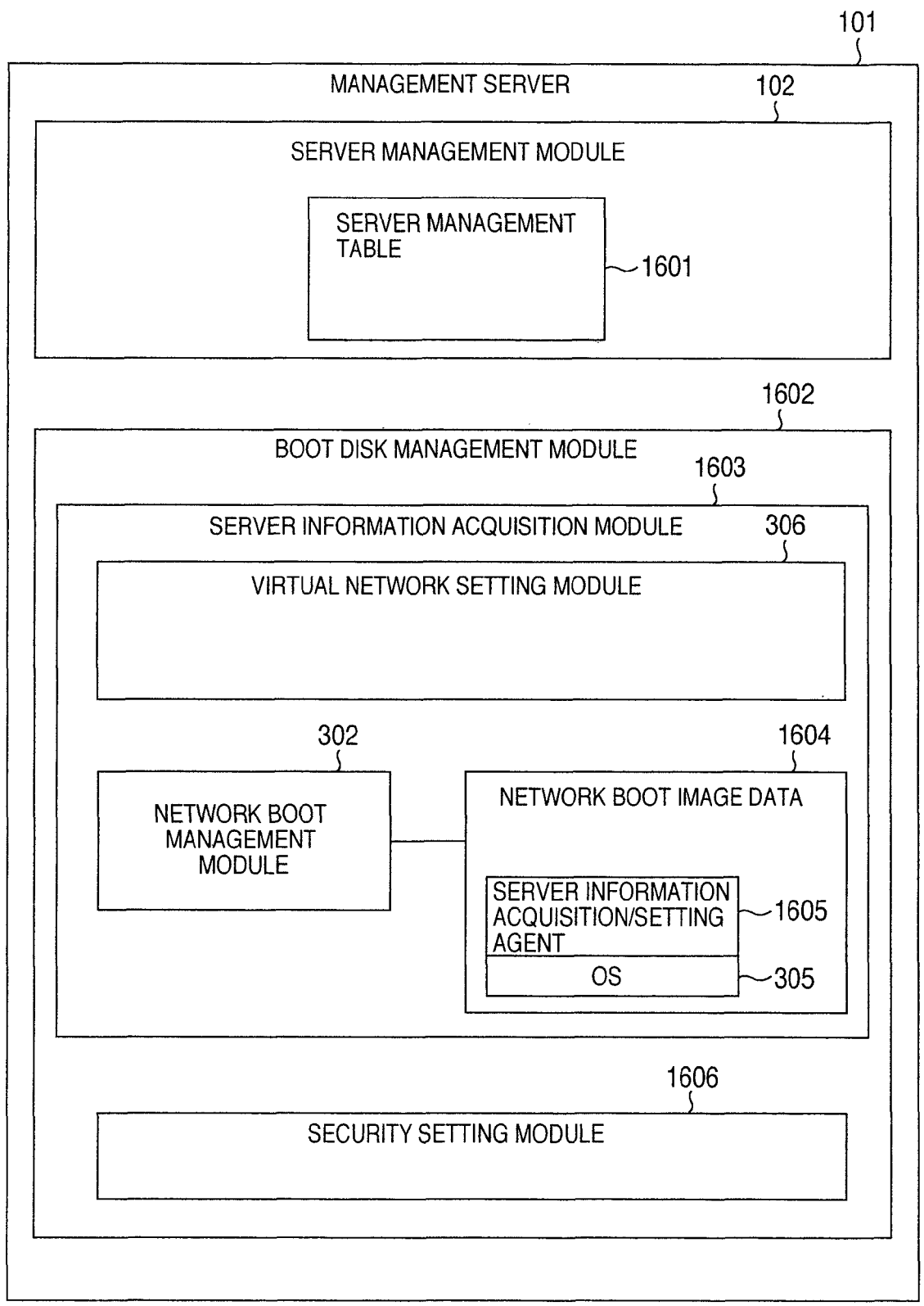
FIG. 16 is a diagram showing the configuration of a management server in a second embodiment of a computer system in which a boot disk method according to the present invention is executed.

FIG. 16 is a diagram showing the configuration of a management server 101 in a second embodiment used in a computer system in which the method of booting an operating system according to the present invention is used. In the second embodiment, a WWN storage memory 204 stored in a fiber channel adapter 111 can be rewritten. The second embodiment differs from the first embodiment in a server management table 1601, a boot disk management module 1602, and a security setting module 1606. The boot disk management module 1602 differs greatly from that of the first embodiment in the structure of network boot image data. Unlike the server information acquisition agent 304 in the first embodiment, a server information acquisition/setting agent 1605, which is an agent program running on an OS 305, has a function to write information.

FIG. 17 shows the server management table 1601. This table corresponds to the server management table 301 in the first embodiment to which a column 1701 is added. The column 1701 contains the WWN to be allocated to each server. This column contains WWN data to be written into the WWN storage memory of the fiber channel adapter 111 when a new server is added.

Figure 18:
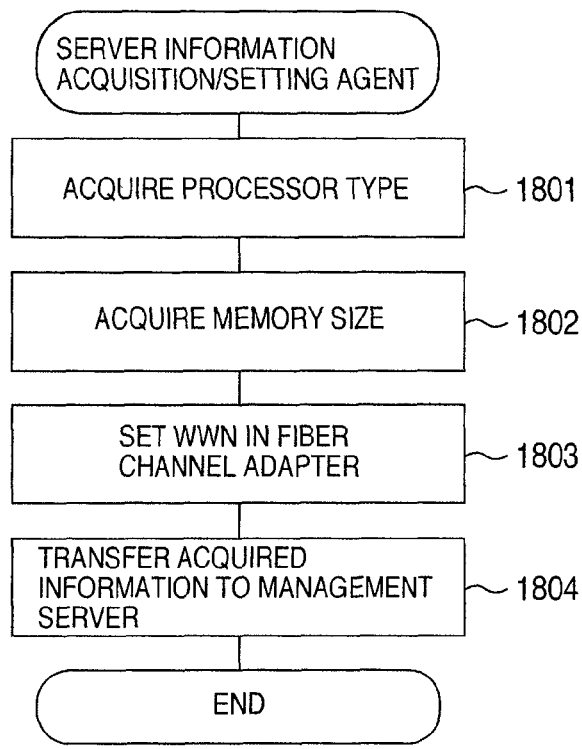
FIG. 18 is a flowchart showing the processing of a server information acquisition/setting agent in the second embodiment.

FIG. 18 shows the processing flowchart of the server information acquisition/setting agent 1605. This processing is started automatically when the network boot operation is performed as shown in FIG. 12 and FIG. 13. In step 1801, the processor type is acquired. In step 1802, the memory size is acquired. In step 1803, a WWN is set in the fiber channel adapter. The WWN data that is set in this step is the WWN corresponding to the server registered in the server management table 1601. In step 1804, the acquired information is transferred to the management server 101. The sequence of processing steps are prepared in such a way that, when an OS 305 is booted via a network, the server information acquisition/setting agent 1605 is started automatically to execute the processing.

Figure 19:
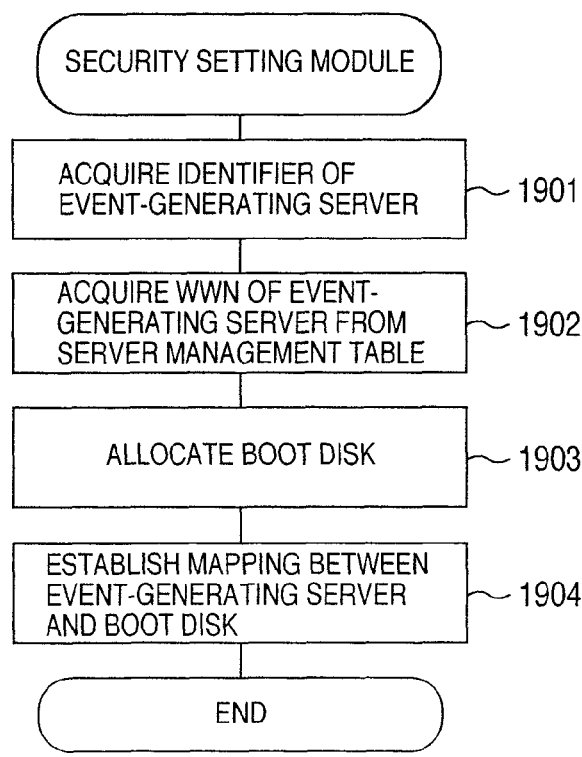
FIG. 19 is a flowchart showing the processing of a security setting module in the second embodiment.

FIG. 19 is the processing flowchart of the security setting module 1606. In step 1901, the identifier of the event-generating server is acquired. In step 1902, the WWN information corresponding to the server whose identifier is acquired in step 1901 is acquired. In step 1903, a boot disk is allocated. In this step, it is possible to request the creation of a new disk in the disk array or, alternatively, to reserve a plurality of boot disks in advance and acquire a boot disk, which is to be allocated, from the reserved boot disks as necessary. In step 1904, a request is issued to associate the event-generating server with the boot disk allocated in step 1903 with the WWN acquired in step 1902 as the parameter. The security module 116 processes this request. By performing the above processing for a fiber channel adapter whose WWN can be changed, a new disk is associated with the server and the disk is prepared for installing the OS thereon.

Figure 20:
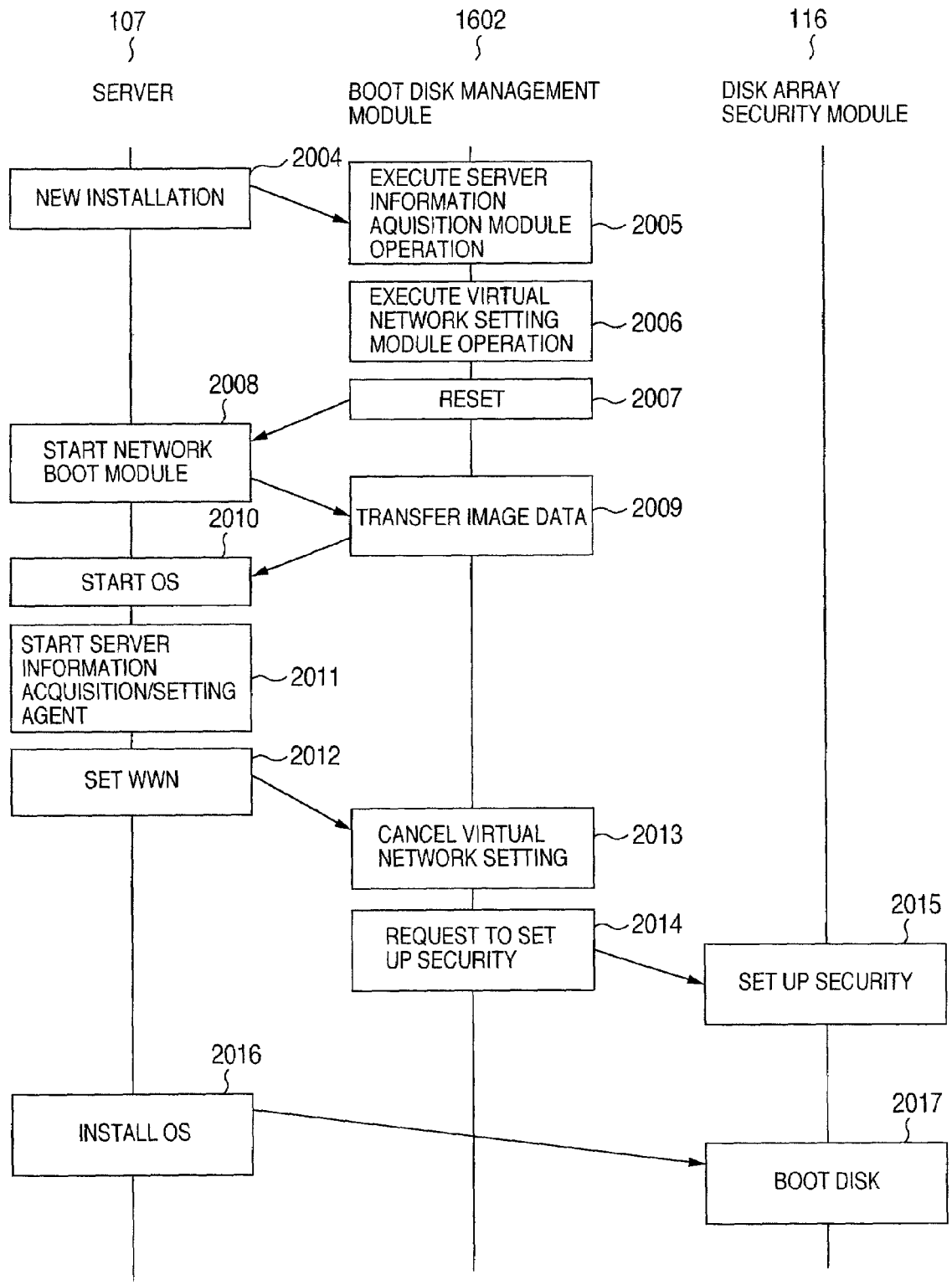
FIG. 20 is a diagram showing the sequence of the operation in the second embodiment.

FIG. 20 shows the booting sequence of the second embodiment. The figure shows the sequence of operations performed by a server 107, a boot disk management module 1602, and a disk array security module 116. Step 2004 indicates the installation event of a new server. For example, in a blade server, an event is issued automatically when a new server is installed. For a single-unit server, it is also possible for the system manager to manually issue an event after the server is connected to the network switch. This sequence is applicable also to an event generated in a case in which a new server is not installed but an already installed server, which is not yet set up, is put into use. The event described here is an event that is generated when a server, for which no disk is yet determined for installing the OS, is newly used. This event, when generated, causes the server information acquisition module 1603 of the boot disk management module 1602 to start the operation (step 2005). The server information acquisition module 1603 analyzes the event, determines that a new server is installed, and calls the virtual network setting module 306 (step 2006). The virtual network setting module 306 builds a private network between the newly installed server and the management server. After that, a reset instruction is transferred to the server (step 2007). When the server is reset by the reset instruction, the above-described network boot module 206 of the server starts the operation (step 2008). This causes image data to be transferred from the boot disk management module 1602 (step 2009).

The server 107 uses the transferred image data to start booting the OS (step 2010). At the same time the OS is booted, the server information acquisition/setting agent is started automatically (step 2011), which acquires various server information and sets the WWN (step 2012) and, after that, transfers the acquired information to the boot disk management module 1602. After confirming that the server information is transferred, the boot disk management module 1602 releases the virtual network built by the virtual network setting module 306 (step 2013) to return the network status to the status before the boot disk management module 1602 was started. After that, the security setting module 1606 uses the WWN, which is set in the sever, to request the security module 116 of the disk array device 109 to associate the server with the disk (step 2014). By executing the sequence of processing steps described above, the disk on which the OS is installed is automatically prepared for the newly installed server.

Third Embodiment

Figure 21:
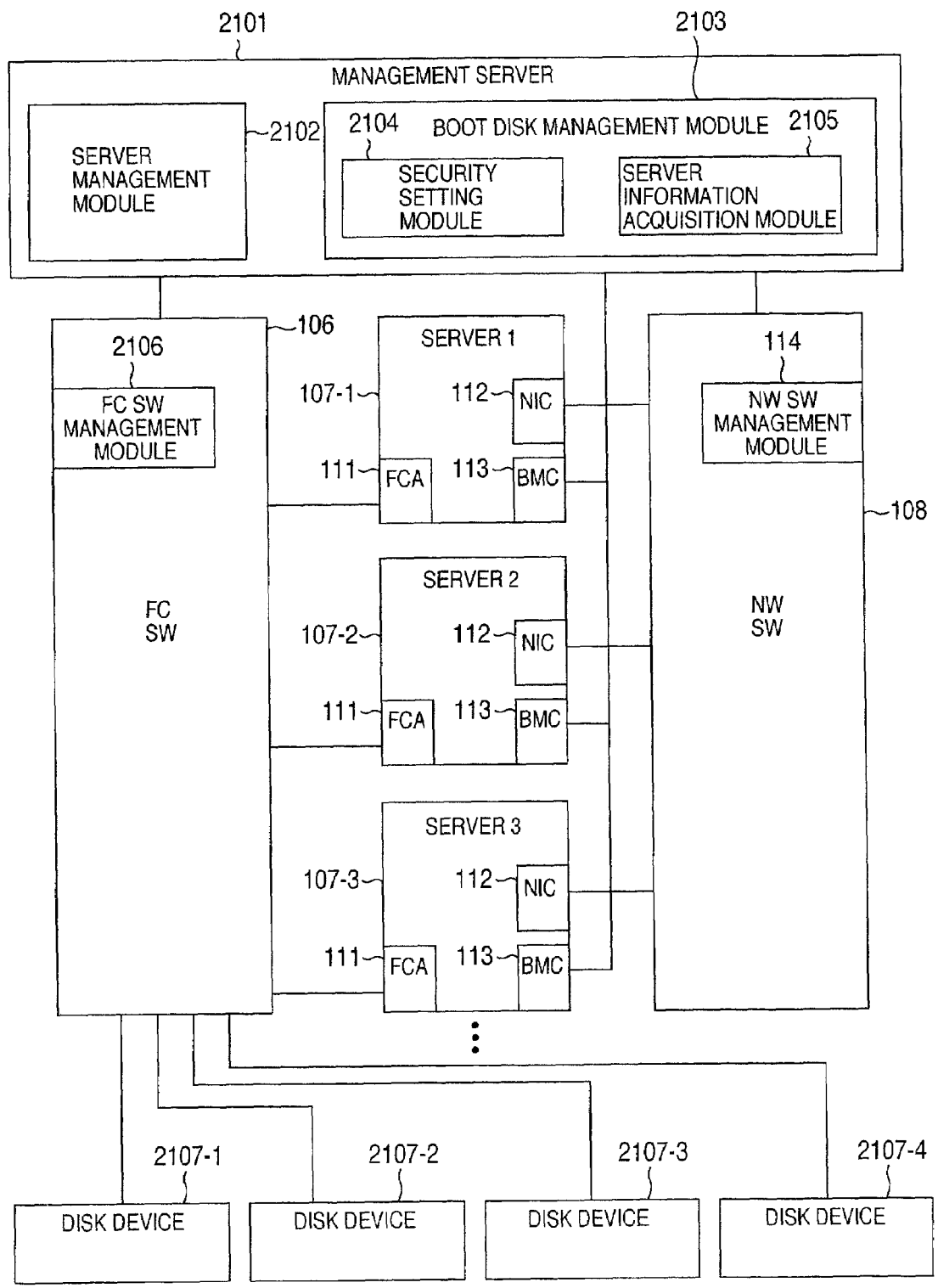
FIG. 21 is a diagram showing the general configuration of a third embodiment of a computer system in which a boot disk method according to the present invention is executed.

A third embodiment is characterized in that the fiber channel switch performs the security control operation. First, the following describes the configuration with reference to FIG. 21. A fiber channel switch 106 has a function to put connection limitations, called zoning, for each connected port and WWN. For example, this function associates a device connected to port 1 of the fiber channel switch 106 with a device connected to port 10 to make those devices invisible to other devices. This function can be used for the disk allocation according to the present invention.

A plurality of servers 107-1, 107-2, 107-3, - - - are connected to a network switch (NW SW) 108 via a network interface card (NIC) 112, and to a fiber channel switch 106 via a fiber channel adapter (FCA) 111. One of the servers is represented by numeral 107 hereinafter. The fiber channel switch 106 is connected also to disk devices 2107-1, 2107-2, 2107-3, 2107-4, - - - to allow the server 107 to access it. One of the disk devices is represented by numeral 2107 hereinafter. The network switch 108 is connected also to a management server 2101 that manages the system. The fiber channel switch 106 contains a fiber channel switch management function 2106 to allow the fiber channel switch 106 to be remotely controlled via a network. The server 107 contains a BMC (Baseboard Management Controller) 113 for monitoring the status of the hardware of the server 107, for controlling the power supply, and for resetting the server 107 via a network.

In general, a power separate from that of the server 107 is supplied to the BMC 113 to allow the BMC 113 to be remotely controlled via a network even when the server 107 stops. The management server 2101 monitors the status of, and controls, the server 107, the network switch 108, the fiber channel switch 106, and the disk devices 2107, as necessary via a network. The management server 2101 comprises a server management module 2102 and a boot disk management module 2103. The server management module 2102 manages servers as well as the devices connected to the servers. The boot disk management module 2103, a module for managing disks necessary for booting servers, is one of the modules that characterize the present invention. The boot disk management module 2103 comprises a security setting module 2104 and a server information acquisition module 2105. The security setting module 2104 is a module for controlling the fiber channel switch management module 2106 included in the fiber channel switch 106. The server information acquisition module, which is a module for acquiring information regarding the servers, has a function to control a network switch management module 114 and so on in the network switch 108 for acquiring information on the servers 107. In the third embodiment of the present invention, when an operating system is installed on the disk device 2107, the server 107 associates the server 107 with a disk device 2107 before the operating system is installed.

Figure 22:
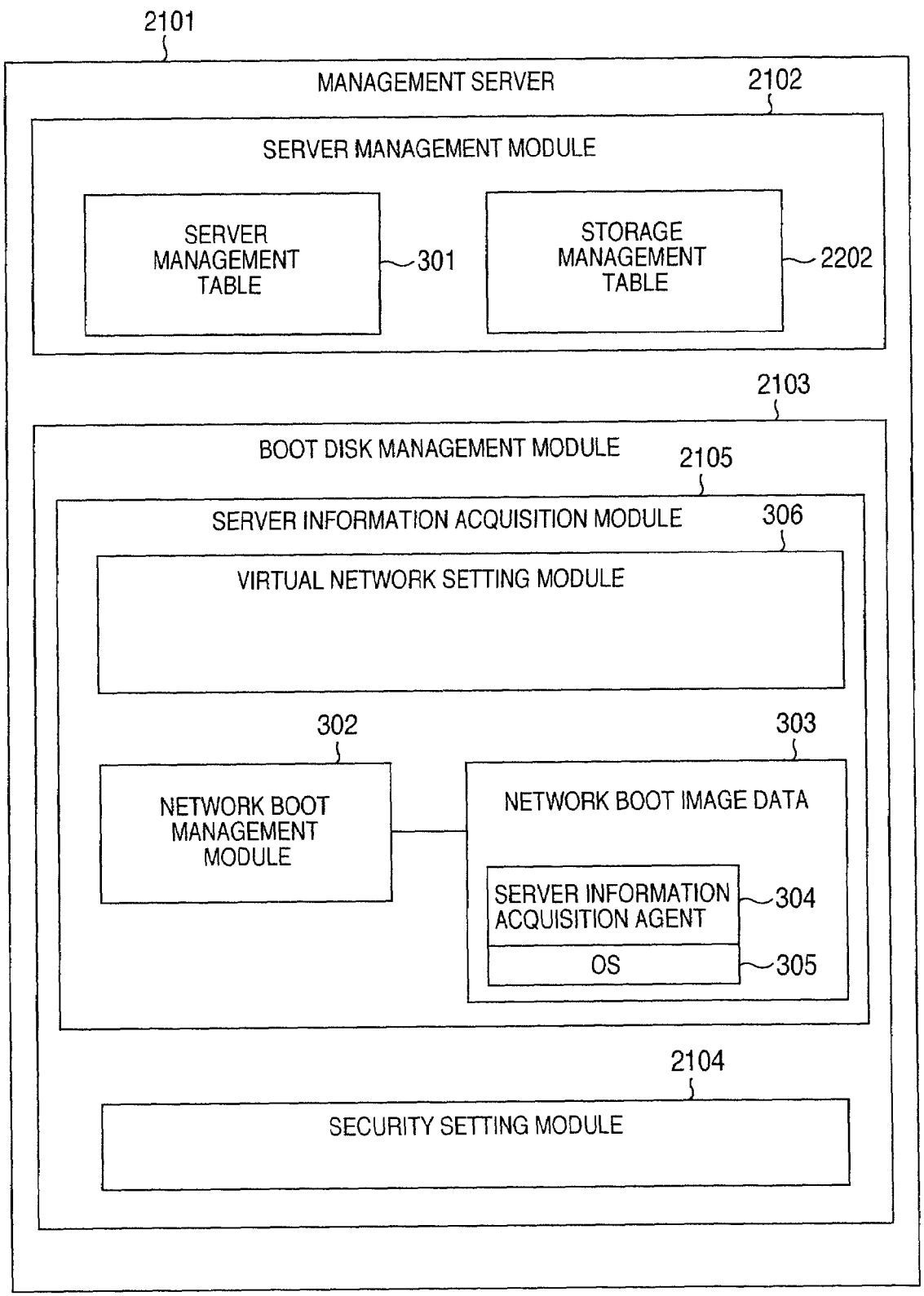
FIG. 22 is a diagram showing the configuration of a management server in the third embodiment.

FIG. 22 is a diagram showing the configuration of the management server 2101. The management server 2101 comprises a server management module 2102 and a boot disk management module 2103. The server management module 2102 monitors the status of, and controls, the servers 107-1, 107-2, 107-3, - - - . For example, the server management module monitors an event indicating whether the currently running server is normally running or an event of a newly added server. In this case, the important information is about what servers are being managed. To keep track of this information, the server management module has a server management table 301 and a storage management table 2202. The server management table 301 contains configuration information and setting information on the servers being monitored or controlled. The storage management table 2202 is a table containing the connection relation of storage connected to the servers. The boot disk management module 2103 comprises the server information acquisition module 2105 and the security setting module 2104.

The server information acquisition module 2105 comprises a virtual network setting module 306 and a network boot management module 302. The virtual network setting module has a function to build a virtual network in the network switch 108 shown in FIG. 21. A virtual network is a function to logically divide the devices, physically connected to the same network switch, into a plurality of networks. The virtual network setting module 306 in this embodiment builds a private network between a server being controlled and the management server. The network boot management module 302 performs processing corresponding to the network boot module 206 shown in FIG. 2.

In response to a request from the network boot module 206, the network boot management module 302 transfers network boot image data 303 and information necessary for the network boot operation. The network boot image in this embodiment contains an operating system (OS) 305 and a server information acquisition agent 304 running on the OS. The server information acquisition agent 304 is set up in such a way that, when the OS 305 is booted, the server information acquisition agent 304 starts the operation automatically. The security setting module 104 controls the fiber channel switch management module 2106 of the fiber channel switch 106 to associate a server with a disk.

Figures 23, 24:
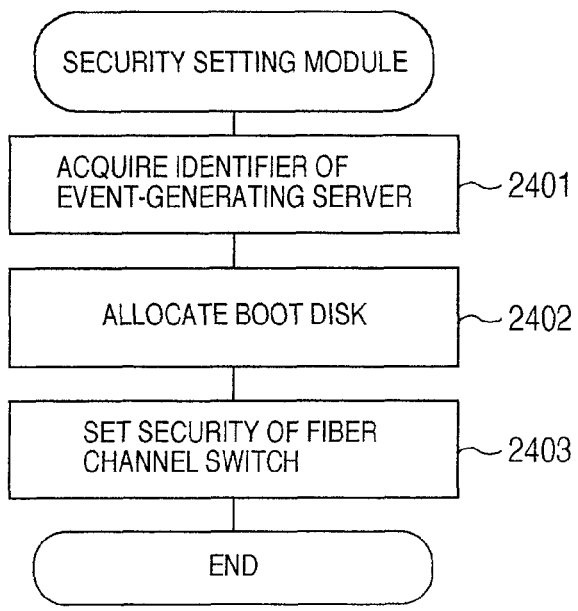
FIG. 23 is a diagram showing a storage management table in the third embodiment.
FIG. 24 is a flowchart showing the processing of a security setting module in the third embodiment.

FIG. 23 shows the configuration of the storage management table 2202. A column 2301 contains the identifier of a connected device and, more specifically, the identifier of a server or the identifier of a disk. A column 2302 contains the connection port number of a fiber channel switch. A column 2303 contains the type of a connected device. This table indicates the connection configuration of the fiber channel switch 106.

FIG. 24 shows the processing flow of the security setting module 2104. In step 2401, the identifier of an event-generating server is acquired. The server identifier acquired in this step can be used to search the storage management table in FIG. 23 to find the port number of the fiber channel switch 106 to which the event-generating server is connected. In step 2402, a boot disk is allocated. In step 2403, the security setting module 2104 controls the fiber channel switch management module 2106 of the fiber channel switch 106 and, using a server connected to a port of the fiber channel switch 106 or the WWN acquired by the agent, associates the server with a disk device 2107 also connected to the fiber channel switch 106.

Figure 25:
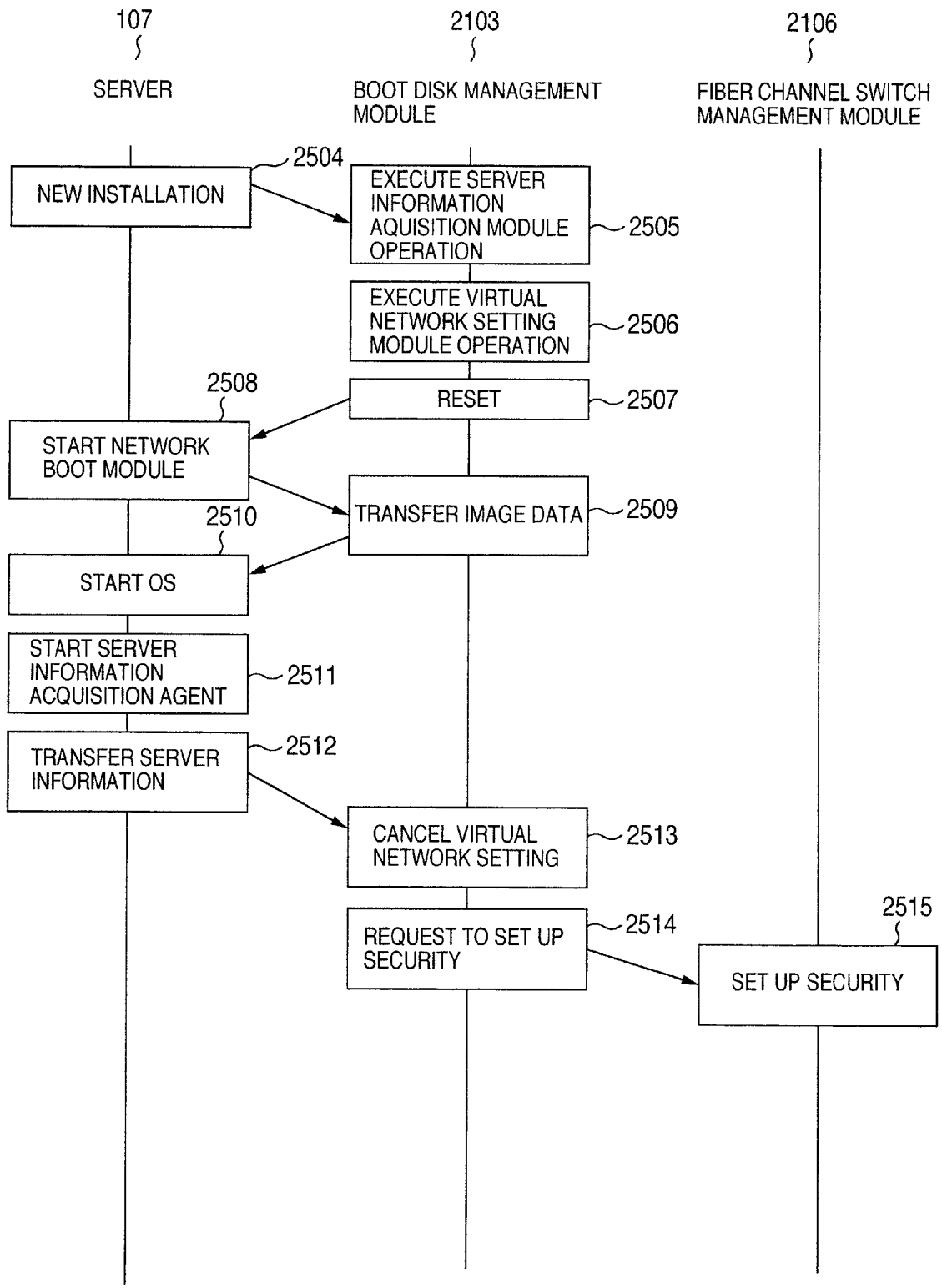
FIG. 25 is a diagram showing the sequence of the operation in the third embodiment of the present invention.

FIG. 25 shows the operation sequence of the third embodiment. The figure shows the sequence of operations performed by a server 107, a boot disk management module 2103, and a fiber channel switch management module 2106. Step 2504 indicates the installation event of a new server. For example, in a blade server, an event is issued automatically when a new server is installed. For a single-unit server, it is also possible for the system manager to manually issue an event after the server is connected to the network switch. This sequence is applicable also to an event generated in a case in which a new server is not installed but an already installed server, which is not yet set up, is put into use. The event described here is an event that is generated when a server, for which no disk is yet determined for installing the OS, is newly used. This event, when generated, causes the server information acquisition module 2105 of the boot disk management module 2103 to start the operation. The server information acquisition module 2105 analyzes the event, determines that a new server is installed, and calls the virtual network setting module 306 (step 2506). The virtual network setting module 306 builds a private network between the newly installed server and the management server. After that, a reset instruction is transferred to the server (step 2507). When the server is reset by the reset instruction, the above-described network boot module 206 of the server 107 starts the operation (step 2508).

This causes image data 303 to be transferred from the boot disk management module 2103 (step 2509). The server 107 uses the transferred image data to start booting the OS (step 2510). At the same time the OS is booted, the server information acquisition agent 304 is started automatically (step 2511), which acquires various server information and, after that, transfers the acquired information to the boot disk management module 2103 (step 2512). This information includes the WWN of the fiber channel adapter of the server. After confirming that the server information is transferred, the boot disk management module 2103 releases the virtual network (step 2513) built by the virtual network setting module 306 in step 2506 to return the network status to the status before the boot disk management module 2103 was started. After that, the boot disk management module 2103 requests the fiber channel switch management module 2106 of the fiber channel switch 106 to associate the server with a disk using the WWN included in the acquired server information and the storage management table 2202 (step 2514). By executing the sequence of processing steps described above, the disk on which the OS is installed is automatically prepared for the newly installed server via the fiber channel switch 106.

Fourth Embodiment

A fourth embodiment is characterized by a function that automatically allocates a server disk newly connected to the disk array device.

Figure 26:
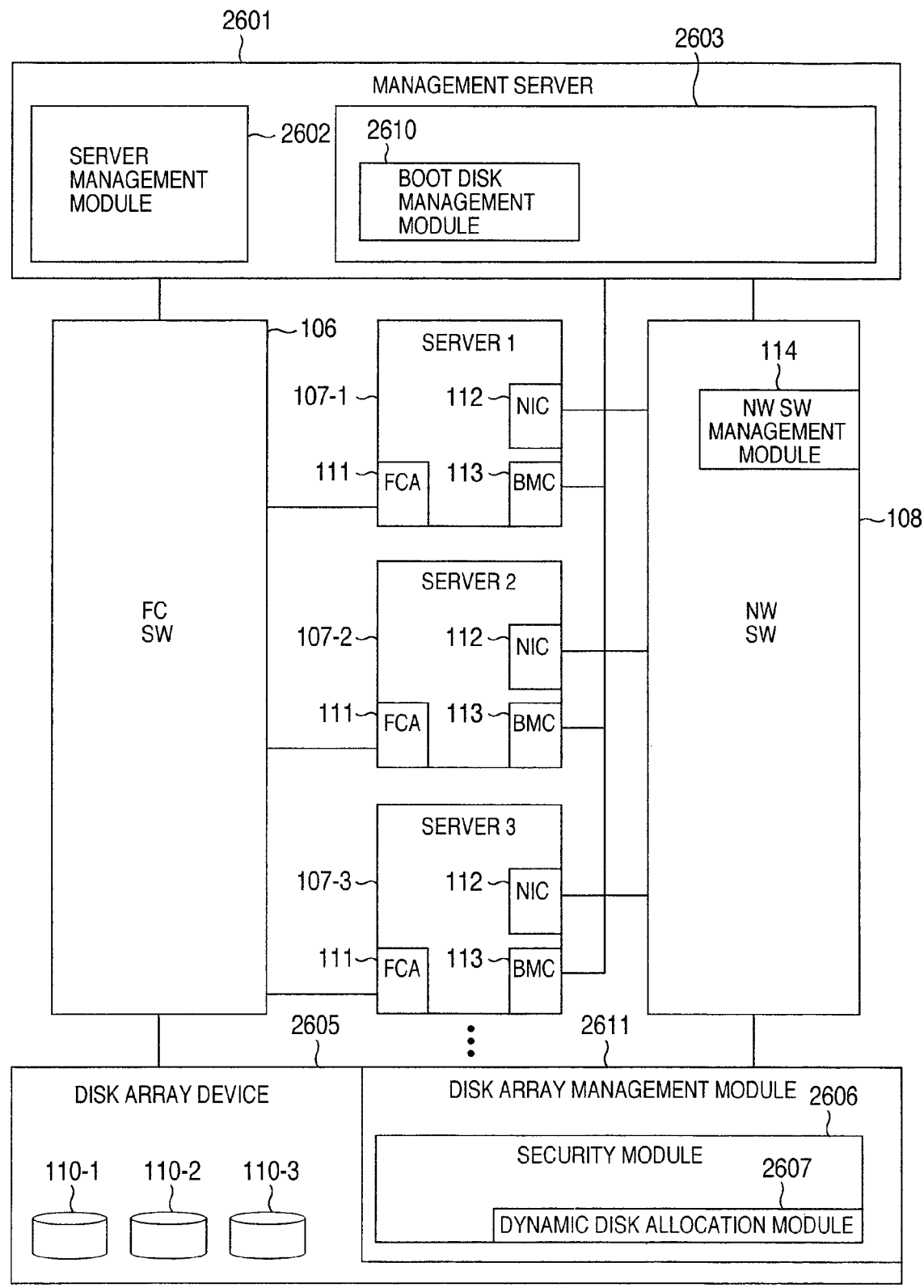
FIG. 26 is a diagram showing the general configuration of a fourth embodiment of a computer system in which a boot disk method according to is the present invention is executed.

FIG. 26 is a diagram showing the general configuration of the fourth embodiment. A plurality of servers 107-1, 107-2, 107-3, - - - are connected to a network switch (NW SW) 108 via a network interface card (NIC) 112, and to a fiber channel switch 106 via a fiber channel adapter (FCA) 111. The fiber channel switch 106 is connected also to a disk array device 2605 to allow the server 107 to access it. The network switch 108 is connected also to a management server 2601 that manages the system. Each server 107 contains a BMC (Baseboard Management Controller) 113 for monitoring the status of the hardware of the server 107, for controlling the power supply, and for resetting the server 107 via a network. In general, a power separate from that of the server 107 is supplied to the BMC 113 to allow the BMC 113 to be remotely controlled via a network even when the server 107 stops.

The management server 2601 monitors the status of, and controls, the servers 107, the network switch 108, the fiber channel switch 106, and the disk array device 2605, as necessary via a network. The management server 2601 comprises a server management module 2602 and a boot disk management module 2603. The server management module 2602 manages servers as well as the devices connected to the servers. The boot disk management module 2603, a module for managing disks necessary for booting servers, is one of the modules that characterize the present invention. The boot disk management module 2603 comprises a security setting module 2610. A security module 2606 is a module for controlling a disk array management module 2611 in the disk array device 2605; more specifically, the security module 2606 controls the disk array management module 2611 to associate a server with a disk 110 in the disk array device.

A dynamic disk allocation module 2607 is one of the modules that characterize the present invention. The dynamic disk allocation module 2607 has a function to dynamically allocate a disk to a server 107 when a server 107 with a new WWN tries to access a disk. In the fourth embodiment of the present invention, when the operating system of a server 107 is stored in the disk array device 2605, the server 107 dynamically associates the server 107 with a disk 110 in the disk array device 2605 before the operating system is installed.

Figure 27:
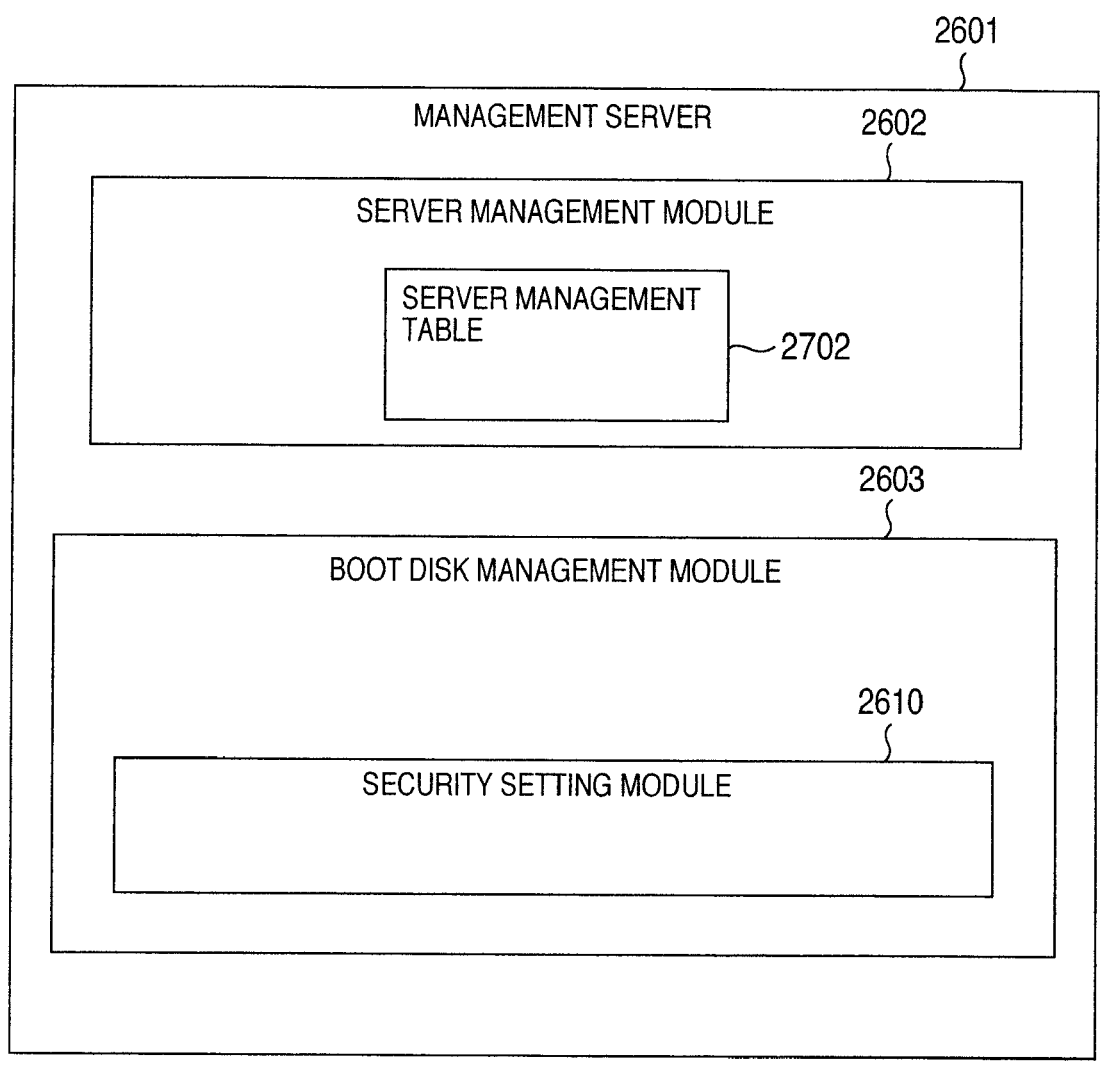
FIG. 27 is a diagram showing the configuration of a management server in the fourth embodiment.

FIG. 27 is a diagram showing the configuration of the management server 2601 (101) shown in FIG. 26. The management server 2601 comprises the server management module 2602 and the boot disk management module 2603. The server management module 2602 monitors the status of, and controls, servers. For example, the server management module 2602 monitors an event indicating whether the currently running server is normally running or an event of a newly added server. In this case, the important information is about what servers are being managed. To keep track of this information, the server management module 2602 has a server management table 2702. The server management table 2702 contains configuration information and setting information on the servers being monitored or controlled. The boot disk management module 2603 comprises the security setting module. The security setting module 2610 controls the security module 2606 of the disk array device 2605 to associate a server with the disk devices 110.

Figure 28:
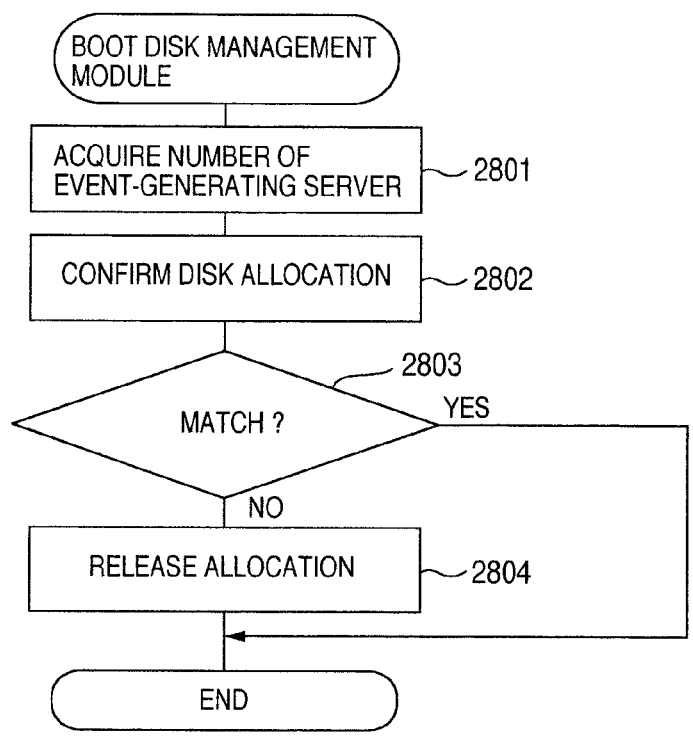
FIG. 28 is a flowchart showing the processing of a boot disk management module in the fourth embodiment.

FIG. 28 is a flowchart showing the processing of the boot disk management module 2603. In step 2801, the server number of an event-generating server is acquired. In step 2802, the allocation of a disk is confirmed. This step determines if the disk, allocated to the server by the dynamic disk allocation module 2607 of the disk array device 2605, is associated with a correct server. This is a processing step to confirm that the disk is not allocated to a server incorrectly. In step 2803, whether the WWN transferred from the server matches the disk associated by the disk array device 2605. If the WWNs do not match, the allocation is released immediately in step 2804. This release processing prevents the dynamic disk allocation module 2607 from allocating a disk to a server incorrectly.

Figure 29:
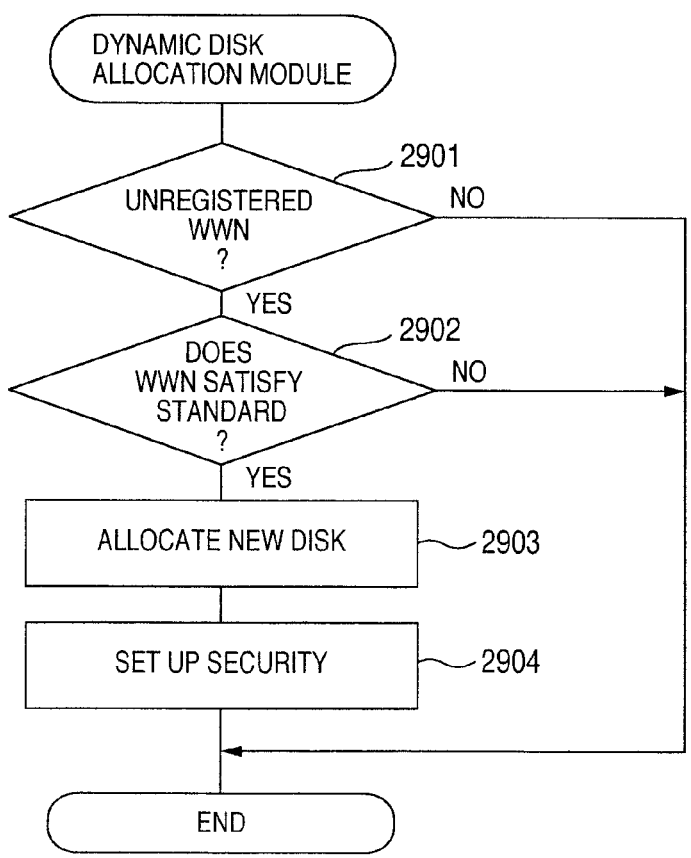
FIG. 29 is a flowchart showing the processing of a dynamic disk allocation module in the fourth embodiment.

FIG. 29 is a flowchart showing the processing of the dynamic disk allocation module 2607. In step 2901, whether the WWN of the server that accesses a disk is a WWN registered in the security module 2606. If the access is made from a server with a WWN that is not registered, control is passed to step 2902 to determine if the WWN satisfies the standard. Because a WWN issued by some manufacturer conforms to a predetermined rule, the dynamic disk allocation is allowed if the access is made from a device of a specific manufacturer in accordance with that rule. If the WWN satisfies the standard, control is passed to step 2903 to allocate a new disk. In step 2904, the WWN and the newly allocated disk are associated. The processing steps described above prevent a disk from being allocated when access is made from an incorrect server.

FIG. 30 shows the operation sequence of the fourth embodiment. The figure shows the sequence of operations performed by the server 107, the boot disk management module 2603, and the security module 2606 of the disk array. In step 3004, access is made from a new server to the disk array. When this access is made, the security module 2606 in the disk array device 2605 dynamically allocates a disk (step 3005). This dynamic allocation requires the number of processing steps fewer than that required in other embodiments. However, when the system is composed of a plurality of servers, it is necessary to confirm that the disk is allocated to a correct server. To do so, it is necessary to confirm that the disk is allocated to the new server correctly, using the WWN received from the server information acquisition agent that runs on the installed OS (step 3008). By executing this processing step, the disk can be associated with a correct server in fewer processing steps.

The method according to the present invention, which is for use in a computer system where common external disks are provided for a plurality of servers and an operating system of each server is booted from those external disks, uses the security function of a disk array device to prevent updating and alteration from other servers and, thus, boots the operating system safely. Information necessary for setting up this booting method can be acquired automatically. Therefore, the method according to the present invention gives great advantages to a computer system where common disks are used and ensures high usability in this field.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A booting method for use in a computer system having a plurality of servers connected to an external disk device and a management server that is connected to said plurality of servers via a network and manages said plurality of servers, wherein an operating system of said plurality of servers is booted from said external disk device, said booting method comprising the steps of:

storing associated information of a port number of a network switch of said network connecting said servers and an identifier of a virtual network assigned to said port number, said port number and said identifier being associated with each other in said associated information;

storing, by said management server, setting information of said virtual network;

acquiring a first port number of said network connecting a first server of said plurality of servers and a second port number of said network connecting said management server based on said associated information, and setting the identifier of the virtual network established between said first server and said management server;

instructing to boot said first server by said management server;

sending an operating system and an agent program from said management server to said first server via said virtual network;

after booting said operating system in said first server, acquiring unique information of said first server by said agent program;

transferring said unique information of said first server acquired by the agent program to said management server;

setting an input/output (I/O) identifier of said first server by said agent program; and restoring the stored setting information of said virtual network.

2. The booting method according to claim 1, wherein said management server resets said first server after the identifier of the virtual network was assigned.

3. The booting method according to claim 1, wherein said agent program is configured to set the unique information of said first server based on a table which associates said plurality of servers managed by said managing server with respective unique information of the servers.

4. The booting method according to claim 1, said associated information is stored in a server management table which associates an identifier of the server with the identifier of said virtual network.

5. A computer system comprising:

a plurality of servers connected to an external disk device; and a management server that is connected to said plurality of servers via a network and manages said plurality of servers, wherein an operating system of said plurality of servers is booted from said external disk device, wherein booting of said operating system of said plurality of servers comprises:

storing associated information of a port number of a network switch of said network connecting said servers and an identifier of a virtual network assigned to said port number, said port number and said identifier being associated with each other in said associated information, storing, by said management server, setting information of said virtual network, acquiring a first port number of said network connecting a first server of said plurality of servers and a second port number of said network connecting said management server based on said associated information, and setting the identifier of the virtual network established between said first server and said management server, instructing to boot said first server by said management server, sending an operating system and an agent program from said management server to said first server via said virtual network, after booting said operating system in said first server, acquiring unique information of said first server by said again program;

transferring said unique information of said first server acquired by the agent program to said management server, setting an input/output (I/O) identifier of said first server by said agent program, and restoring the stored setting information of said virtual network.

6. The computer system according to claim 5, wherein said management server resets said first server after the identifier of the virtual network was assigned.

7. The computer system according to claim 5, wherein said agent program is configured to set the unique information of said first server based on a table which associates said plurality of servers managed by said managing server with respective unique information of the servers.

8. The computer system according to claim 5, said associated information is stored in a server management table which associates an identifier of the server with the identifier of said virtual network.

9. A non-transitory computer readable storage medium executable by a computer system having a plurality of servers connected to an external disk device and a management server that is connected to said plurality of servers via a network and manages said plurality of servers, wherein an operating system of said plurality of servers is booted from said external disk device, said computer program, when executed, causes the computer system to perform the steps of:

storing associated information of a port number of a network switch of said network connecting said servers and an identifier of a virtual network assigned to said port number, said port number and said identifier being associated with each other in said associated information;

storing, by said management server, setting information of said virtual network;

acquiring a first port number of said network connecting a first server of said plurality of servers and a second port number of said network connecting said management server based on said associated information, and setting the identifier of the virtual network established between said first server and said management server;

instructing to boot said first server by said management server;

sending an operating system and an agent program from said management server to said first server via said virtual network;

after booting said operating system in said first server, acquiring unique information of said first server by said agent program;

transferring said unique information of said first server acquired by the agent program to said management server;

setting an input/output (I/O) identifier of said first server by said agent program; and restoring the stored setting information of said virtual network.

10. The computer program according to claim 9, wherein said management server resets said first server after the identifier of the virtual network was assigned.

11. The computer program according to claim 9, wherein said agent program is configured to set the unique information of said first server based on a table which associates said plurality of servers managed by said managing server with respective unique information of the servers.

12. The computer program according to claim 9, said associated information is stored in a server management table which associates an identifier of the server with the identifier of said virtual network.

* * * * *